(12) United States Patent
Kamimae et al.

(10) Patent No.: US 9,238,901 B2
(45) Date of Patent: Jan. 19, 2016

(54) SUPPORTING MECHANISM, EXHAUST TREATMENT UNIT, AND WHEEL LOADER

(71) Applicant: KOMATSU LTD., Tokyo (JP)

(72) Inventors: Takeshi Kamimae, Kanazawa (JP); Hisato Kitaoka, Hakusan (JP); Toshimitsu Honda, Komatsu (JP); Masaya Ota, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/365,359

(22) PCT Filed: Aug. 9, 2013

(86) PCT No.: PCT/JP2013/071714
§ 371 (c)(1),
(2) Date: Jun. 13, 2014

(87) PCT Pub. No.: WO2015/019502
PCT Pub. Date: Feb. 12, 2015

(65) Prior Publication Data
US 2015/0233089 A1     Aug. 20, 2015

(51) Int. Cl.
*B60K 13/04*  (2006.01)
*E02F 9/08*   (2006.01)
(Continued)

(52) U.S. Cl.
CPC .............. *E02F 9/0866* (2013.01); *B60K 13/04* (2013.01); *E02F 9/0883* (2013.01); *F01N 3/021* (2013.01); *F01N 3/2066* (2013.01); *F01N 2250/02* (2013.01)

(58) Field of Classification Search
CPC ...... B60K 13/04; E02F 9/0883; E02F 9/0866; F01N 3/00; F01N 3/2066; F01N 3/021; F01N 2250/02; F16M 13/02; F16M 13/00; F16M 11/00

USPC .......... 180/309, 89.2, 311, 296; 60/295, 297; 248/637, 678, 676, 677, 671
See application file for complete search history.

(56) References Cited

U.S. PATENT DOCUMENTS 6,354,078 B1 *  3/2002  Karlsson et al. ................ 60/274
8,141,535 B2 *  3/2012  Olsen et al. ............... 123/198 E
(Continued)

FOREIGN PATENT DOCUMENTS

CN      102016255 A    4/2011
EP      2 189 580 A2   5/2010
(Continued)

OTHER PUBLICATIONS

The International Search Report for the corresponding international application No. PCT/JP2013/071714, issued on Nov. 5, 2013.
(Continued)

*Primary Examiner* — James M Dolak
(74) *Attorney, Agent, or Firm* — Global IP Counselors, LLP

(57) ABSTRACT

A supporting mechanism supports first and second exhaust treatment devices for treating exhaust gas from an engine, and includes a sub-bracket, a base bracket, and first and second supporting members. The base bracket includes first and second connecting parts, and first and second pipe members. The sub-bracket supports the first and second exhaust treatment devices. The base bracket supports the sub-bracket. The first and second supporting members respectively support one side and the other side of the base bracket. The first and second connecting parts are respectively joined to the first and second supporting members. The first and second pipe members are installed between the first and second connecting parts. The sub-bracket is attached to the first and second pipe members, extends in the lateral direction of the first and second pipe members, and is separated from the first and second connecting parts.

17 Claims, 13 Drawing Sheets

(51) Int. Cl.
*F01N 3/021* (2006.01)
*F01N 3/20* (2006.01)

(56) References Cited

U.S. PATENT DOCUMENTS

| | | | | |
|---|---|---|---|---|
| 8,191,668 | B2* | 6/2012 | Keane et al. | 180/296 |
| 8,403,099 | B2* | 3/2013 | Yokota | 180/309 |
| 8,516,807 | B2* | 8/2013 | Kosaka et al. | 60/299 |
| 8,651,218 | B2* | 2/2014 | Okada | 180/296 |
| 8,915,328 | B2* | 12/2014 | Okada | 180/309 |
| 8,950,535 | B2* | 2/2015 | Harada et al. | 180/296 |
| 8,973,692 | B1* | 3/2015 | Okuda et al. | 180/68.5 |
| 9,010,095 | B2* | 4/2015 | Himoto et al. | 60/297 |
| 9,016,426 | B2* | 4/2015 | Himoto | E02F 9/0833 180/296 |
| 9,033,095 | B2* | 5/2015 | Sakai | F01N 13/1805 180/309 |
| 9,061,582 | B2* | 6/2015 | Sawada | B60K 13/04 180/309 |
| 9,074,344 | B1* | 7/2015 | Harada | E02F 3/764 |
| 9,080,307 | B2* | 7/2015 | Numa | B60K 11/06 |
| 9,133,601 | B2* | 9/2015 | Mori | E02F 9/0866 |
| 9,145,806 | B2* | 9/2015 | Nakagami | F01N 3/10 |
| 9,157,214 | B2* | 10/2015 | Tsumura | E02F 9/0866 |
| 2010/0031644 | A1 | 2/2010 | Keane et al. | |
| 2010/0126791 | A1 | 5/2010 | Okada | |
| 2010/0186381 | A1 | 7/2010 | Charles et al. | |
| 2010/0186394 | A1* | 7/2010 | Harrison et al. | 60/299 |
| 2010/0269494 | A1 | 10/2010 | Saito et al. | |
| 2011/0167808 | A1 | 7/2011 | Kosaka et al. | |
| 2012/0247861 | A1 | 10/2012 | Mizuno et al. | |
| 2012/0273648 | A1 | 11/2012 | Maske et al. | |
| 2013/0213725 | A1 | 8/2013 | Togo et al. | |
| 2013/0213726 | A1 | 8/2013 | Okada | |
| 2014/0348716 | A1 | 11/2014 | Park | |

FOREIGN PATENT DOCUMENTS

| | | |
|---|---|---|
| JP | 2010-127094 A | 6/2010 |
| JP | 2011-163339 A | 8/2011 |
| JP | 2012-2016 A | 1/2012 |
| JP | 2012-97413 A | 5/2012 |
| JP | 2013-104394 A | 5/2013 |
| JP | 2013-112284 A | 6/2013 |
| JP | 2014-118739 A | 6/2014 |
| WO | 2013103169 A1 | 7/2013 |
| WO | 2014/184860 A1 | 11/2014 |

OTHER PUBLICATIONS

International Search Report for the related international application No. PCT/JP2013/071713, issued on Nov. 5, 2013.
Office Action for the related Japanese application No. 2014-529370, issued on Sep. 16, 2015.
Office Action for the related Chinese application No. 201380004256, issued on Sep. 6, 2015.
Supplementary Partial European Search Report for the corresponding European application No. 13 86 3672, dated on Aug. 6, 2015.
The extended European search report for the corresponding European patent application No. 13863671.7, issue on Oct. 15, 2015.

* cited by examiner

US 9,238,901 B2

SUPPORTING MECHANISM, EXHAUST TREATMENT UNIT, AND WHEEL LOADER

CROSS-REFERENCE TO RELATED APPLICATIONS

This application is a U.S. National stage application of International Application No. PCT/JP2013/071714, filed on Aug. 9, 2013.

BACKGROUND

1. Field of the Invention

The present invention relates to a wheel loader, and in particular to a wheel loader equipped with an exhaust treatment device, such as a diesel particulate filter device.

2. Background Information

Recently, as exhaust gas regulation is tightened, wheel loaders are being equipped with two or more types of exhaust treatment devices (see U.S. Pat. No. 8,191,668). These exhaust treatment devices include, for example, a diesel particulate filter (DPF) device and a selective catalytic reduction (SCR) device. The diesel particulate filter device collects and removes particulate matter, such as soot, included in the diesel engine exhaust. The selective catalytic reduction device reduces nitrogen oxides (NOx) in the exhaust gas.

A plurality of exhaust treatment devices are disposed above an engine in the invention according to U.S. Pat. No. 8,191,668. The exhaust treatment devices are mounted on a flat platform. The platform is covered above the engine. The platform is supported by a base frame provided below the edges of the platform. The base frame is supported by legs that are coupled to a vehicle frame around the engine. The platform is provided with holes for allowing a connecting pipe joining the engine and the exhaust treatment device to pass through, and holes for reducing the weight of the platform.

SUMMARY

Some parts protrude from the engine in the vicinity of the engine. As described above, it is difficult in the invention according to U.S. Pat. No. 8,191,668 to open holes near the base frame due to problems of the strength even when holes are provided in the platform. Therefore, the position of the platform needs to be higher than the positions of the parts so that the parts in the vicinity of the edge parts of the engine do not come into contact with the platform.

When the position of the platform is set higher than that of the parts protruding from the engine, the position of an exterior over for covering the engine room also becomes higher. Therefore, a problem arises that rearward visibility is adversely affected.

An object of the present invention is to provide a supporting mechanism, an exhaust treatment unit, and a wheel loader that enables the exhaust treatment device to be disposed in a position as low as possible so that rearward visibility may be improved in a work vehicle in which the exhaust gas treatment device is disposed above the engine.

A supporting mechanism according to a first aspect of the present invention supports a first exhaust treatment device for treating exhaust gas from an engine, and is provided with a sub-bracket, a base bracket, a first supporting member, and a second supporting member. The base bracket includes a first connecting part, a second connecting part, and a first pipe member. The sub-bracket supports the first exhaust treatment device. The base bracket supports the sub-bracket. The first supporting member supports one side of the base bracket. The second supporting member supports the other side of the base bracket. The first connecting part is joined to the first supporting member. The second connecting part is joined to the second supporting member. The first pipe member is installed between the first connecting part and the second connecting part. The sub-bracket is attached to the first pipe member, extends in the lateral direction of the first pipe member therefrom, and is separated from the first connecting part and the second connecting part. The first exhaust treatment device overlaps the first pipe member in a top view.

The supporting mechanism according to a second aspect of the present invention supports a second exhaust treatment device for treating exhaust gas from an engine and is provided with a sub-bracket, a base bracket, a first supporting member, and a second supporting member. The base bracket includes a first connecting part, a second connecting part, and a second pipe member. The sub-bracket supports the second exhaust treatment device. The base bracket supports the sub-bracket. The first supporting member supports one side of the base bracket. The second supporting member supports the other side of the base bracket. The first connecting part is joined to the first supporting member. The second connecting part is joined to the second supporting member. The second pipe member is installed between the first connecting part and the second connecting part. The sub-bracket is attached to the second pipe member, extends in the lateral direction of the second pipe member therefrom, and is separated from the first connecting part and the second connecting part. The second exhaust treatment device overlaps the second pipe member in a top view.

The supporting mechanism according to a third aspect of the present invention supports a first exhaust treatment device and a second exhaust treatment device for treating exhaust gas from an engine, and is provided with a sub-bracket, a base bracket, a first supporting member, and a second supporting member. The base bracket includes a first connecting part, a second connecting part, a first pipe member, and a second pipe member. The base bracket supports the first exhaust treatment device and the second exhaust treatment device. The base bracket supports the sub-bracket. The first supporting member supports one side of the base bracket. The second supporting member supports the other side of the base bracket. The first connecting part is joined to the first supporting member. The second connecting part is joined to the second supporting member. The first pipe member and the second pipe member are installed between the first connecting part and the second connecting part. The sub-bracket is attached to the first pipe member and the second pipe member, extends in the lateral direction of the first pipe member and the second pipe member therefrom, and is separated from the first connecting part and the second connecting part.

The first pipe member may be attached to a lower surface of the sub-bracket in the supporting mechanism according to the first aspect. The second pipe member may be attached to a lower surface of the sub-bracket in the supporting mechanism according to the second aspect. The first pipe member and the second pipe member may be attached to a lower surface of the sub-bracket in the supporting mechanism according to the third aspect.

The sub-bracket may have a first hole penetrating in the vertical direction in the supporting mechanism according to the first to the third aspects.

The longitudinal direction of the first exhaust treatment device and the longitudinal direction of the second exhaust treatment device may extend along a first direction from the middle of the longitudinal direction of the first connecting part to the middle of the longitudinal direction of the second connecting part in the supporting mechanism according to the third aspect. The first exhaust treatment device and the second exhaust treatment device may be disposed side by side in the horizontal direction.

The base bracket may further include a middle member installed above the sub-bracket and between the first connecting part and the second connecting part. Moreover, a lower end of the middle member may be positioned above the lower ends of the first pipe member and the second pipe member in the supporting mechanism according to the third aspect.

The first connecting part may further include a first end plate that is attached to one end of the first pipe member, one end of the second pipe member, and one end of the middle member in the supporting mechanism according to the third aspect. The second connecting part may include a second end plate that is attached to the other end of the first pipe member, the other end of the second pipe member, and the other end of the middle member.

The first pipe member may include first bend parts facing away from the second pipe member at one end and at the other end of the first pipe member in the supporting mechanism according to the third aspect. The second pipe member may include second bend parts facing away from the first pipe member at one end and at another end of the second pipe member.

The sub-bracket may further include a first mounting bracket for fixing the first exhaust treatment device and a second mounting bracket for fixing the second exhaust treatment device in the supporting mechanism according to the third aspect. At least one of the first mounting bracket and the second mounting bracket may have a second hole corresponding to the first hole.

An exhaust treatment unit according to a fourth aspect of the present invention is provided with the abovementioned supporting mechanism according to the third aspect, and a first exhaust treatment device, and a second exhaust treatment device. An upper end of the middle member may be positioned higher than a lower end of the first exhaust treatment device and a lower end of the second exhaust treatment device.

The exhaust treatment unit may further be provided with a relay connecting pipe that connects the first exhaust treatment device and the second exhaust treatment device. The upper end of the middle member may be positioned below the lower end of the relay connecting pipe.

A wheel loader according to a fifth aspect of the present invention is provided with the abovementioned supporting mechanism according to the first to third aspects, or the abovementioned exhaust treatment unit, and an engine. The engine may include a sensor part in an upper part of the engine. The sensor part may be positioned below the sub-bracket.

A wheel loader according to a sixth aspect of the present invention is provided with the abovementioned supporting mechanism according to the first or third aspects, or the abovementioned exhaust treatment unit, and an engine. The wheel loader may be further provided with a connecting pipe that connects the engine and the first exhaust treatment device. The connecting pipe may pass beside the first pipe member between the sub-bracket and the first connecting part or between the sub-bracket and the second connecting part.

The wheel loader according to the fifth aspect or the sixth aspect may further be provided with a hydraulic fluid tank disposed in front of the engine and a stand for supporting the hydraulic fluid tank. The first supporting member may be fixed to the stand.

The wheel loader according to the fifth aspect or the sixth aspect may further be provided with a vehicle frame. The second supporting member may include a left leg part, a right leg part, an upper beam part, and a receiving part. The left leg part and the right leg part may be fixed to the vehicle frame, extend in the vertical direction, and be disposed side by side in the vehicle width direction. The upper beam part may be fixed to an upper part of the left leg part and to an upper part of the right leg part, and extend in the vehicle width direction. The receiving part may be fixed to the middle of the upper beam part in the vehicle width direction and may be coupled with a base member. Furthermore, the width in the left-right direction of the receiving part may be shorter than the width in the left-right direction of the upper beam part. The connecting pipe may pass behind the sub-bracket and may overlap the upper beam part in a top view and may not overlap the receiving part in a top view.

The first exhaust treatment device may be a diesel particulate filter device. The second exhaust treatment device may be a selective catalytic reduction device.

The supporting mechanism, the exhaust treatment unit, and the wheel loader are provided with at least one pipe member among the first pipe member and the second pipe member, and a sub-bracket that extends in the lateral direction of at least one pipe member therefrom. The sub-bracket is separated from the first connecting part and the second connecting part. Therefore, when the sub-bracket is disposed to keep away from parts protruding above the engine, the base bracket can be installed in a position as low as possible. Therefore, in a wheel loader in which the exhaust treatment device is disposed above the engine, the exhaust treatment device is disposed in a position as low as possible so that rearward visibility can be improved.

DETAILED DESCRIPTION OF EXEMPLARY EMBODIMENTS

Figure 1:
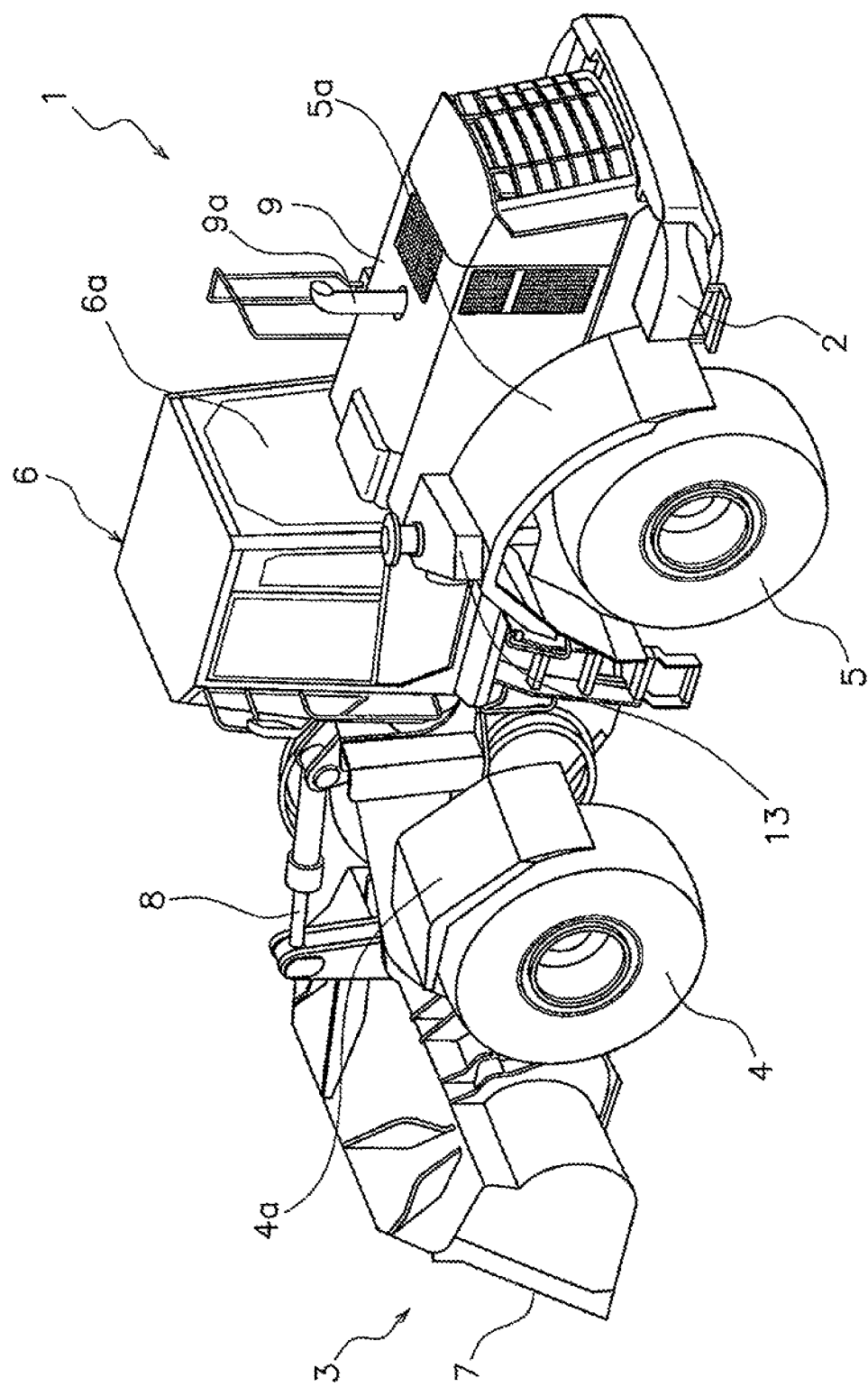
FIG. 1 is an external perspective view of a wheel loader according to an exemplary embodiment of the present invention.

FIG. 1 illustrates an external perspective view of a wheel loader according to an exemplary embodiment of the present invention.

In the following explanation, "front" refers to the front of the vehicle and "rear" refers to the rear of the vehicle. "Left" and "right" refer respectively to the left and right of the vehicle as faced toward the front of the vehicle.

Overall Configuration

A wheel loader 1 includes a vehicle body frame 2, working implement 3, front wheels 4, rear wheels 5, and a cab 6. The wheel loader 1 can run by rotating the front wheels 4 and the rear wheels 5, and desired work can be conducted by using the working implement 3.

The vehicle body frame 2 includes a front body part and a rear body part, and the front body part and the rear body part are connected to each other so that they can swing in the crosswise direction. The working implement 3 and the front wheels 4 are provided on the front body part. The rear wheels 5 and the cab 6 are provided on the rear body part. The working implement 3 is disposed at the front of the front body part and includes a bucket 7 and a bucket cylinder 8 and the like. Fenders 4a and 5a are respectively provided above and to the rear of the front wheels 4 and the rear wheels 5. An air cleaner 13 is disposed on an upper part of the rear wheel fender 5a on the left side. Foreign matters are removed from air taken in toward the engine 15 by the air cleaner 13 and the air is purified. An operating cabin 6a and various operating members and an operating panel are provided inside the cab 6.

Figure 2:
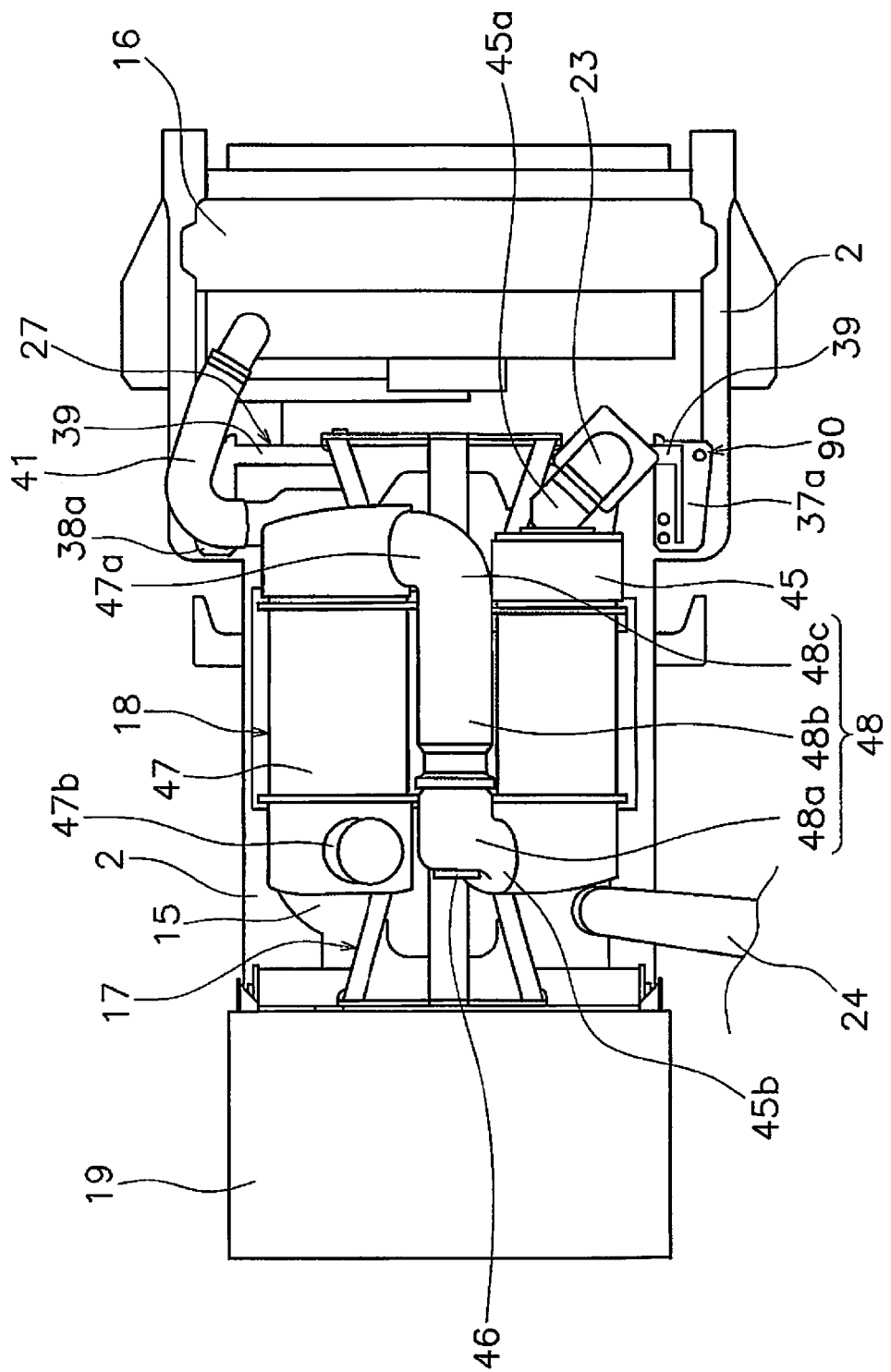
FIG. 2 is a partial top view with the vehicle body cover of the wheel loader of FIG. 1 removed.
Figure 3:
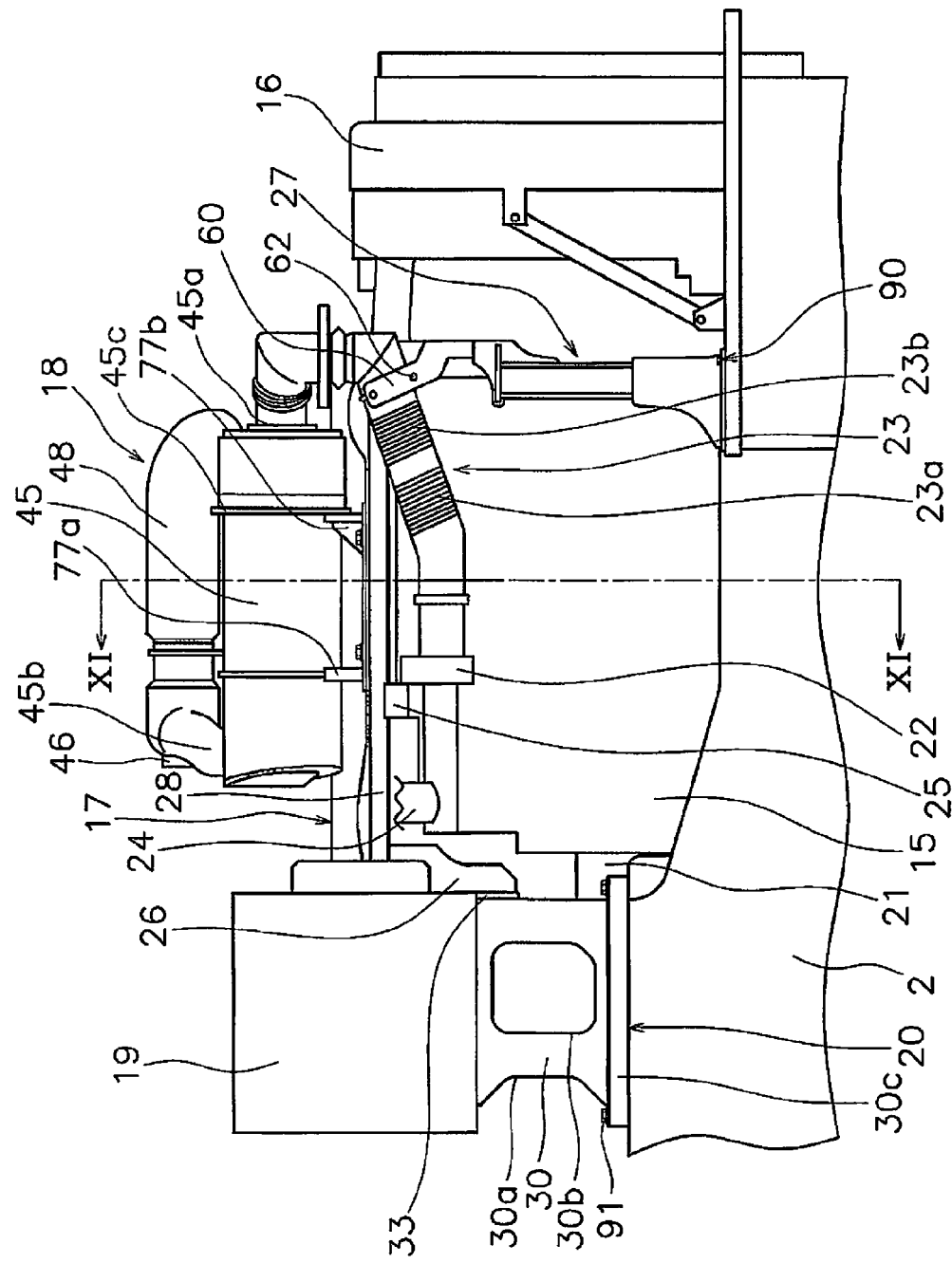
FIG. 3 is a partial left side view with the vehicle body cover of the wheel loader of FIG. 1 removed.
Figure 4:
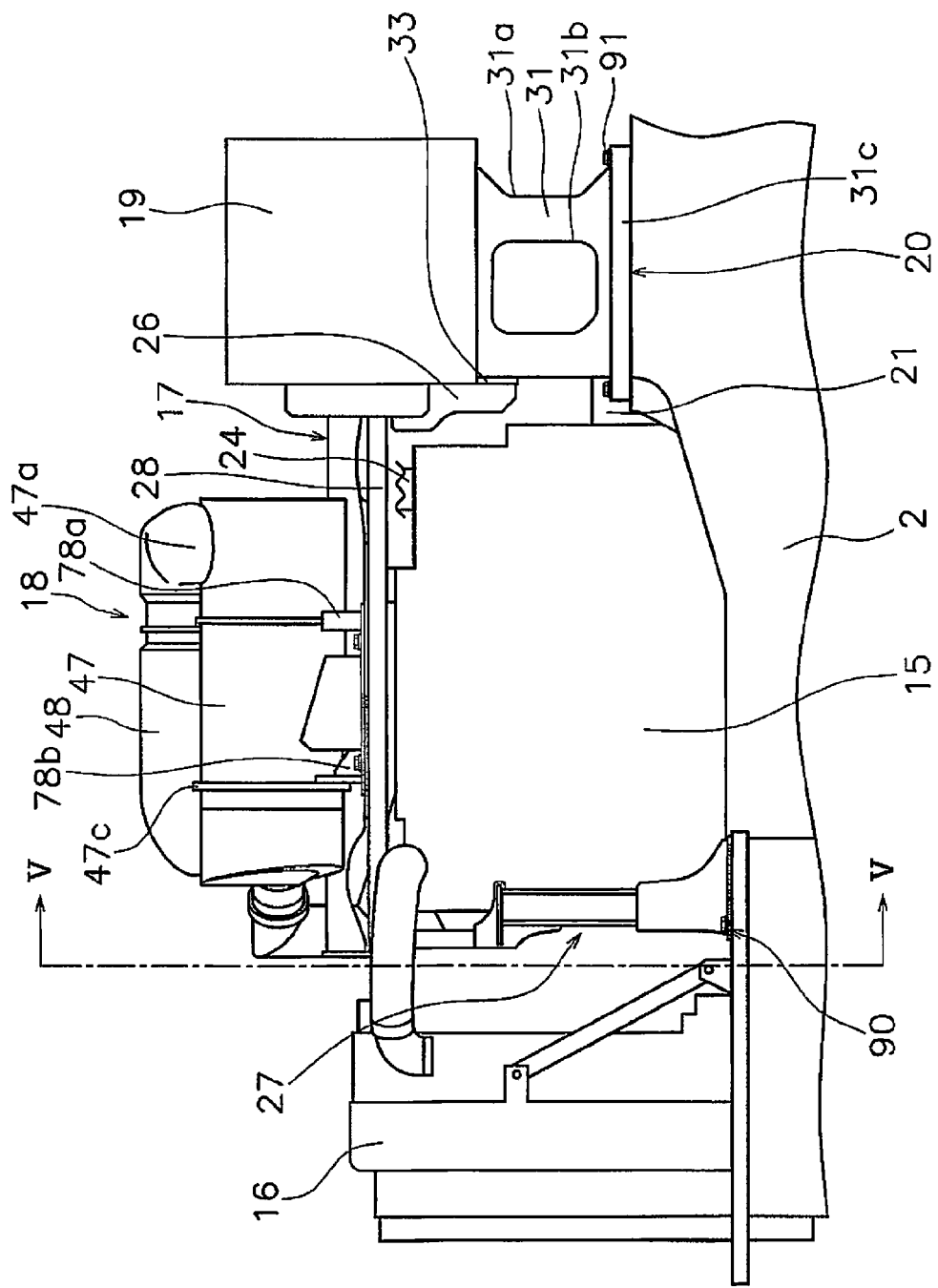
FIG. 4 is a partial right side view with the vehicle body cover of the wheel loader of FIG. 1 removed.

FIG. 2 is a top view of the rear body part with a vehicle body cover 9 (FIG. 1) behind the cab 6 removed. FIG. 3 is a left side view of the rear body part with the vehicle body cover 9 (FIG. 1) behind the cab 6 removed. FIG. 4 is a right side view of the rear body part with the vehicle body cover 9 (FIG. 1) behind the cab 6 removed. The left side of the drawing in FIG. 4 represents the front side of the vehicle. Some parts, such as the rear wheels 5, are omitted from illustration in FIGS. 2 to 4. As illustrated in FIGS. 2 to 5, an engine 15, a cooling unit 16 disposed behind the engine 15, a supporting mechanism 17, and an exhaust treatment system 18 mounted on the supporting mechanism 17 above the engine 15 are disposed in a rear part of the rear body part. In the present exemplary embodiment, the supporting mechanism 17 and the exhaust treatment system 18 are collectively referred to as an exhaust treatment unit. A hydraulic fluid tank 19 is disposed in front of the engine 15. Although not illustrated, the hydraulic fluid tank 19 is disposed behind the cab 6. That is, the hydraulic fluid tank 19 is disposed between the cab 6 and the engine 15. The hydraulic fluid tank 19 is supported by a stand 20 provided therebelow.

Figure 5:
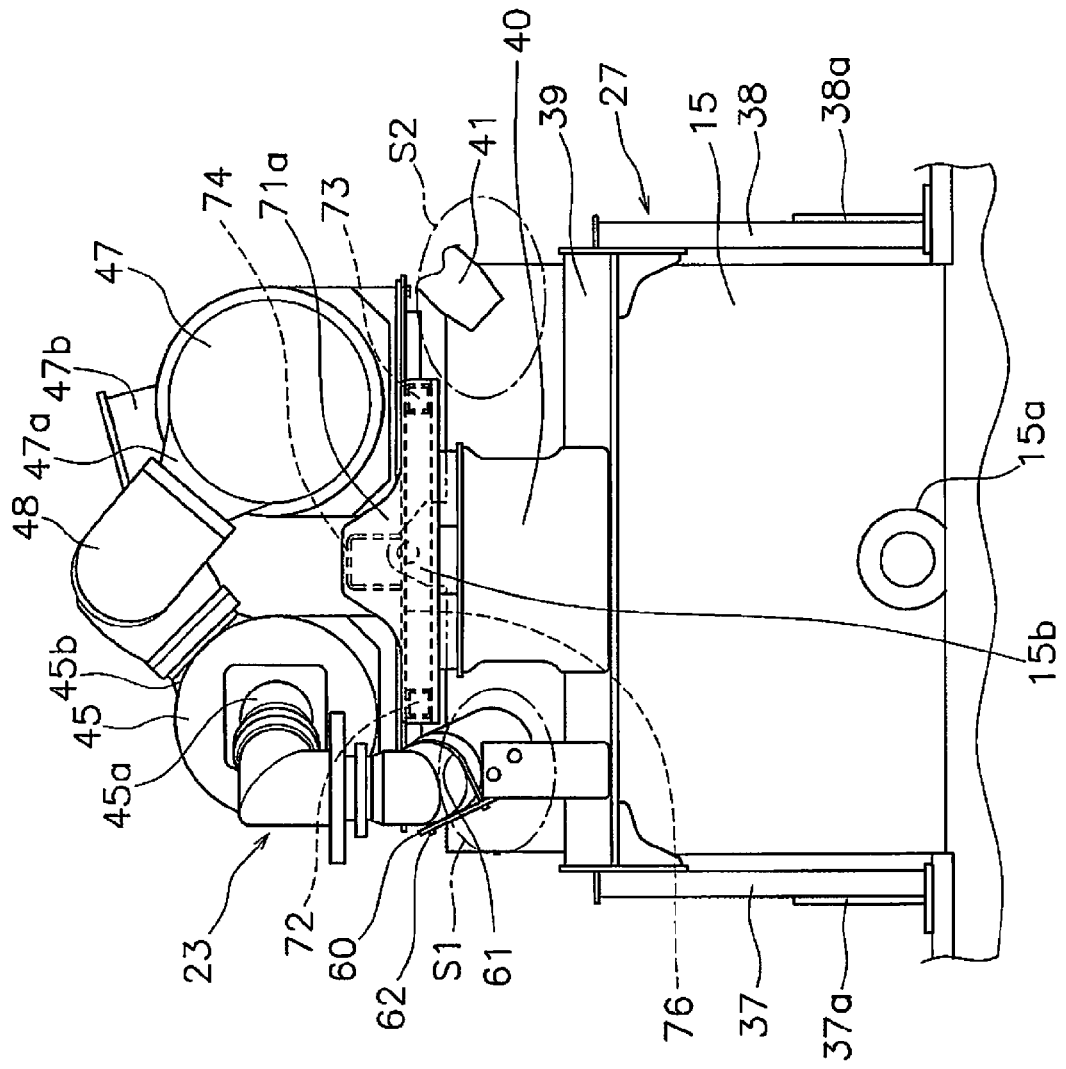
FIG. 5 is a rear view of the engine and the exhaust treatment system a FIG. 4.

FIG. 5 is a rear view of the engine 15 and the exhaust treatment system 18 as seen in a direction of a cross-sectional line V-V in FIG. 4. The engine 15 is a so-called longitudinally mounted engine and is disposed so that a crankshaft 15a extends in the front-back direction of the vehicle. The engine 15 is fixed to a transmission 21 with bolts to form an integrated construction (see FIGS. 3 and 4). The engine 15 and the transmission 21 are supported on the vehicle body frame 2 via rubber mounts (not shown). The engine 15 includes an upper member 15b in an upper part of the engine 15. The upper member 15b is, for example, a hook attachment part for attaching a lifting hook. A lifting hook is attached to the hook attachment part to lift up the engine 15 when repairing the engine 15. Because the upper member 15b cannot be seen directly from the rear of the engine 15 and the exhaust treatment unit, the upper member 15b is represented as a chain double-dashed line in FIG. 5. As illustrated in FIG. 5, the upper member 15b protrudes upward compared to other parts of the engine 15. More specifically, the upper member 15b protrudes upward from a middle portion at the rear end of the engine 15 (see FIG. 12).

As illustrated in FIG. 3, a turbo charger 22 that supercharges air with exhaust gas is provided on the left side of the engine 15. The turbo charger 22 is provided so that an exhaust gas outlet faces to the rear. A connecting pipe 23 is provided between the turbo charger 22 and the exhaust treatment system 18. Two flexible pipe sections 23a and 23b that are bellow-shaped and extendable are provided in the connecting pipe 23. In the state in which the exhaust treatment system 18 is assembled, the engine 15 and the transmission 21 are mounted on the vehicle body frame 2 via the rubber mounts, and the exhaust treatment system 18 is mounted directly onto the vehicle body frame 2 via the supporting mechanism 17. Consequently, the vibrations from the engine 15 and the vibrations from the exhaust treatment system 18 become different while the vehicle is being driven. However, the difference of the two vibrations can be sufficiently absorbed since the relatively long flexible pipe sections 23a and 23b are formed in the connecting pipe 23. Therefore, the vibration of the engine 15 can be suppressed.

A flexible intake pipe 24 (see FIGS. 2 to 4) made of plastic is provided between the turbo charger 22 and the air cleaner 13 (see FIG. 1). A difference in vibration between the engine 15 and the air cleaner 13 is absorbed by the intake pipe 24. A sensor part 25 is provided in front of the turbo charger 22. That is, the engine 15 includes the sensor part 25 in the upper part of the engine 15. The sensor part 25 is an apparatus for measuring various properties included in the exhaust gas from the engine 15 and protrudes upward compared to other parts of the engine 15 (see FIG. 11). More specifically, the sensor part 25 protrudes upward from a portion on the left side and slightly forward of the middle in the front-back direction of the engine (see the chain double dashed line in FIG. 6).

Exhaust Treatment System 18

As illustrated in FIGS. 2 to 4, the exhaust treatment system 18 is provided with a first exhaust treatment device 45, a relay connecting pipe 48, and a second exhaust treatment device 47 in order from the exhaust upstream side (hereinbelow, simply referred to as "upstream side") of the engine 15 side. A urea aqueous solution mixing device 46 is attached to the relay connecting pipe 48.

The first exhaust treatment device 45 is preferably a diesel particulate filter device. The first exhaust treatment device 45 collects particulate matter such as soot and the like in the exhaust gas. That is, the first exhaust treatment device 45 treats the exhaust gas from the engine 15. The urea aqueous solution mixing device 46 emits an urea aqueous solution sucked up by a pump, which is not illustrated, from an urea aqueous solution tank, which is not illustrated either, and adds the urea aqueous solution to the exhaust gas as a reducing agent. The added urea aqueous solution is hydrolyzed to become ammonia, and the ammonia is fed with the exhaust gas through the relay connecting pipe 48 to the second exhaust treatment device 47. The second exhaust treatment device 47 is preferably a selective catalytic reduction device. The second exhaust treatment device 47 uses ammonia from the urea aqueous solution mixing device 46 as the reducing agent to purify by reduction the nitrogen oxides in the exhaust gas. That is, the second exhaust treatment device 47 treats the exhaust gas from the engine 15.

The first exhaust treatment device 45 and the second exhaust treatment device 47 are disposed side by side in the horizontal direction. Specifically, the first exhaust treatment device 45 and the second exhaust treatment device 47 both have cylindrical shapes and are disposed so that their center axes extend parallel to each other in the vehicle front-back direction. That is, the longitudinal direction of the first exhaust treatment device 45 extends along the vehicle front-back direction, and the longitudinal direction of the second exhaust treatment device 47 extends along the vehicle front-back direction. As illustrated in FIGS. 3 to 5, the first exhaust treatment device 45 and the second exhaust treatment device 47 are disposed above the engine 15.

As illustrated in FIGS. 2, 3 and 5, an exhaust gas inlet port 45a of the first exhaust treatment device 45 is provided at a rear end part of the first exhaust treatment device 45 and has an opening that faces to the rear and diagonally to the left. The exhaust gas inlet port 45a is connected to the connecting pipe 23. An exhaust gas outlet port 45b of the first exhaust treatment device 45 is provided at a front end part of the first exhaust treatment device 45 and has an opening that faces to the right and diagonally upward. As illustrated in FIGS. 2, 4 and 5, an exhaust gas inlet port 47a of the second exhaust treatment device 47 is provided at a rear end part and has an opening that faces to the left and diagonally upward. An exhaust gas outlet port 47b of the second exhaust treatment device 47 is provided at a front end part of the second exhaust treatment device 47 and has an opening that faces mostly upward. An exhaust pipe 9a (see FIG. 1) is connected to the exhaust gas outlet port 47b. The relay connecting pipe 48 is disposed between the exhaust gas outlet port 45b of the first exhaust treatment device 45 and the exhaust gas inlet port 47a of the second exhaust treatment device 47.

As illustrated in FIG. 2, the relay connecting pipe 48 has a first bend section 48a, a linear section 48b, and a second bend section 48c, and the entire relay connecting pipe 48 forms an S shape. The first bend section 48a is positioned near the exhaust gas outlet port 45b of the first exhaust treatment device 45, and the second bend section 48c is positioned near the exhaust gas inlet port 47a of the second exhaust treatment device 47. The linear section 48b is positioned between the first bend section 48a and the second bend section 48c and is disposed parallel to the first exhaust treatment device 45 and the second exhaust treatment device 47.

The urea aqueous solution mixing device 46 is provided on the first bend section 48a and emits urea aqueous solution into the relay connecting pipe 48. The emitted urea aqueous solution becomes evenly mixed with the exhaust gas while passing through the long linear section 48b.

Flow of Air and Exhaust Gas

As illustrated in FIG. 3, air is introduced from the air cleaner 13 and fed into the engine 15 through the intake pipe 24 and the turbo charger 22. Exhaust gas from the engine 15 is introduced through the connecting pipe 23 into the exhaust treatment system 18 after driving the turbo charger 22.

Particulate matter, such as soot and the like, is collected by the first exhaust treatment device 45 in the exhaust treatment system 18. Next, the exhaust gas is introduced into the urea aqueous solution mixing device 46. The urea aqueous solution is emitted into the exhaust gas to be mixed with the exhaust gas in the urea aqueous solution mixing device 46. Consequently, the urea aqueous solution is hydrolyzed by the heat of the exhaust gas and water vapor in the exhaust gas to become ammonia. The ammonia generated in this way is fed with the exhaust gas through the relay connecting pipe 48 to the second exhaust treatment device 47. The ammonia is used as the reducing agent to purify by reduction the nitrogen oxides in the exhaust gas in the second exhaust treatment device 47.

Supporting Mechanism 17

Figure 6:
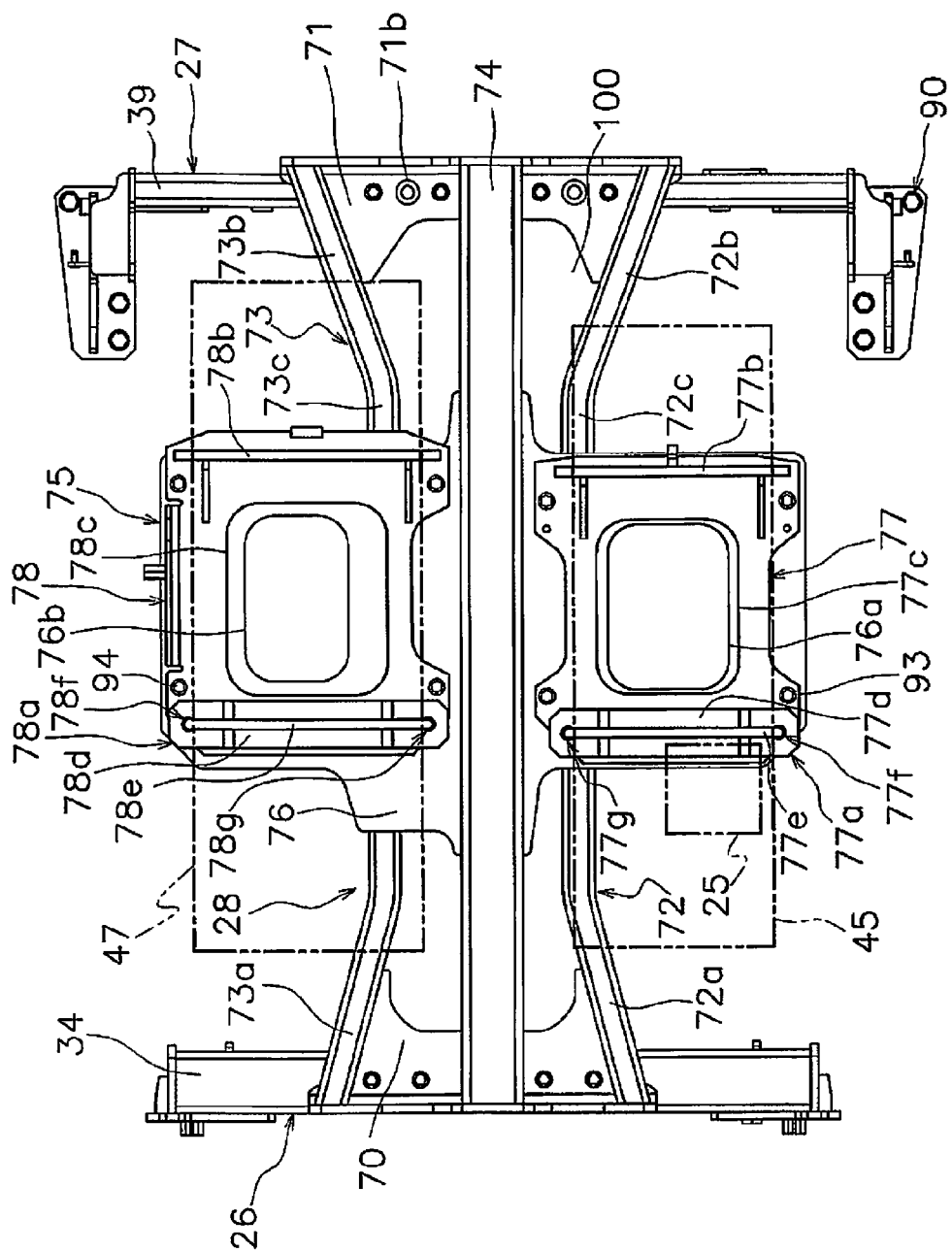
FIG. 6 is a top view of a supporting mechanism.
Figure 7:
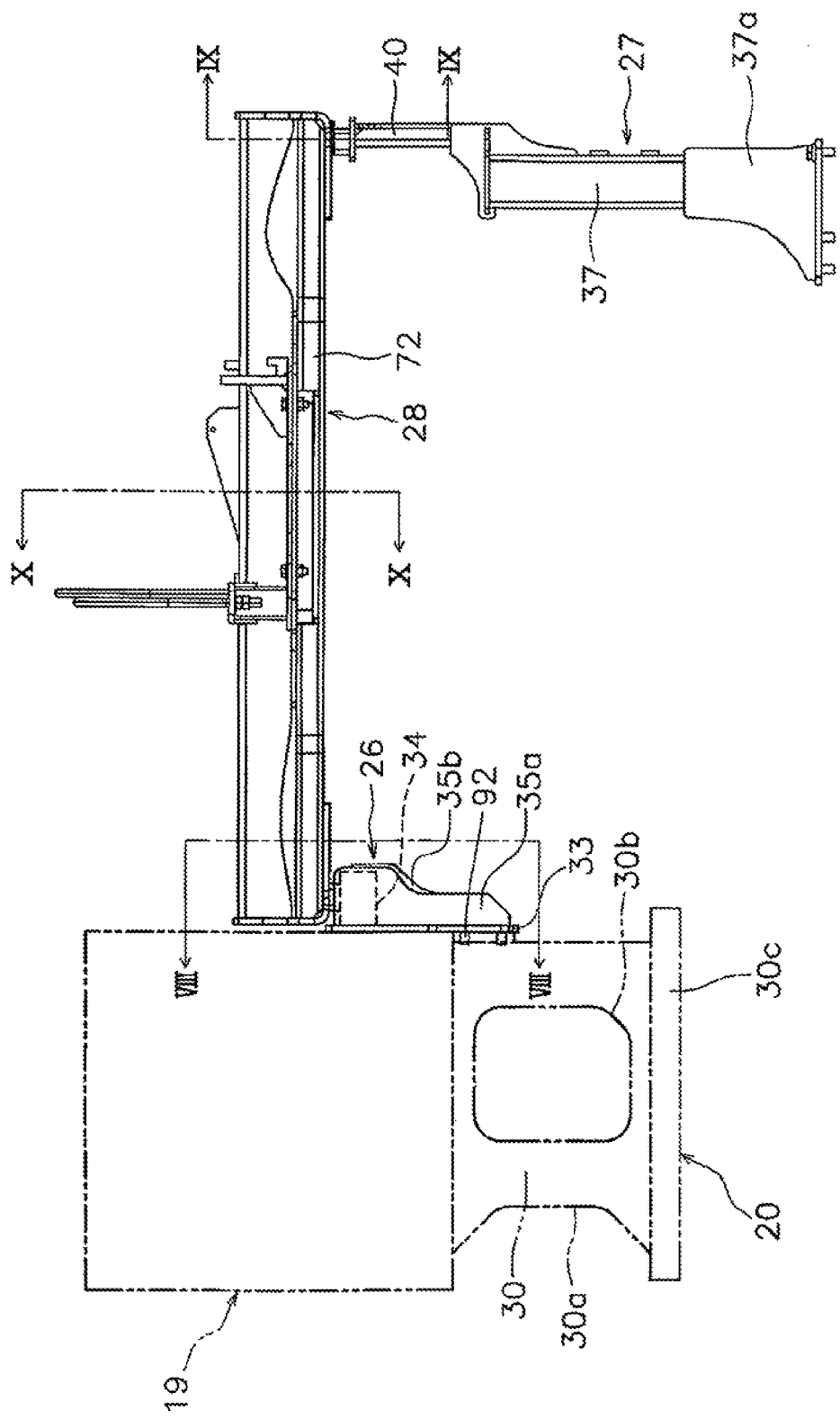
FIG. 7 is a side view of the supporting mechanism.

FIG. 6 is a top view of the supporting mechanism 17. FIG. 7 is a side view of the supporting mechanism 17. The sensor part 25, the first exhaust treatment device 45, and the second exhaust treatment device 47 are represented as chain double-dashed lines in FIG. 6. The hydraulic fluid tank 19 and the stand 20 are represented by a chain double-dashed line in FIG. 7. As illustrated in FIGS. 6 and 7, the supporting mechanism 17 comprises a first supporting member 26, a second supporting member 27, and a base member 28. As illustrated in FIGS. 3 to 5, the first supporting member 26 and the second supporting member 27 are disposed beside the engine 15, and the base member 28 is disposed above the engine 15. As illustrated in FIGS. 2 to 4, the second supporting member 27 is fixed directly to the vehicle frame 2 by a plurality of bolts 90. As illustrated in FIGS. 3, 4 and 7, the first supporting member 26 is fixed directly to a side surface of the stand 20 by a plurality of bolts 92, and the stand 20 is fixed directly to the vehicle frame 2 by a plurality of bolts 91.

As illustrated in FIGS. 3, 4 and 7, the stand 20 includes left and right side parts 30, 31 and a coupling part 33. The stand 20 may further be provided with a top plate (not shown) coupled to upper parts of the left and right side parts 30 and 31, which is for mounting a hydraulic fluid tank. The left and right side parts 30 and 31 are both formed in a rectangular shape and respectively have substantially wedge-shaped notched sections 30a and 31a in the front portion, and holes 30b and 31b in the inside portion thereof. Plates of the left and right side parts 30, 31 respectively have attachment parts 30c, 31c formed at the lower ends thereof to extend in the front-back direction. The attachment parts 30c and 31c are fixed to the vehicle frame 2 with the plurality of bolts 92. The connecting part 33 connects the rear parts of the left and right side parts 30 and 31. As illustrated in FIG. 7, the first supporting member 26 is fixed directly to the coupling part 33 by the plurality of bolts 92.

Figure 8:
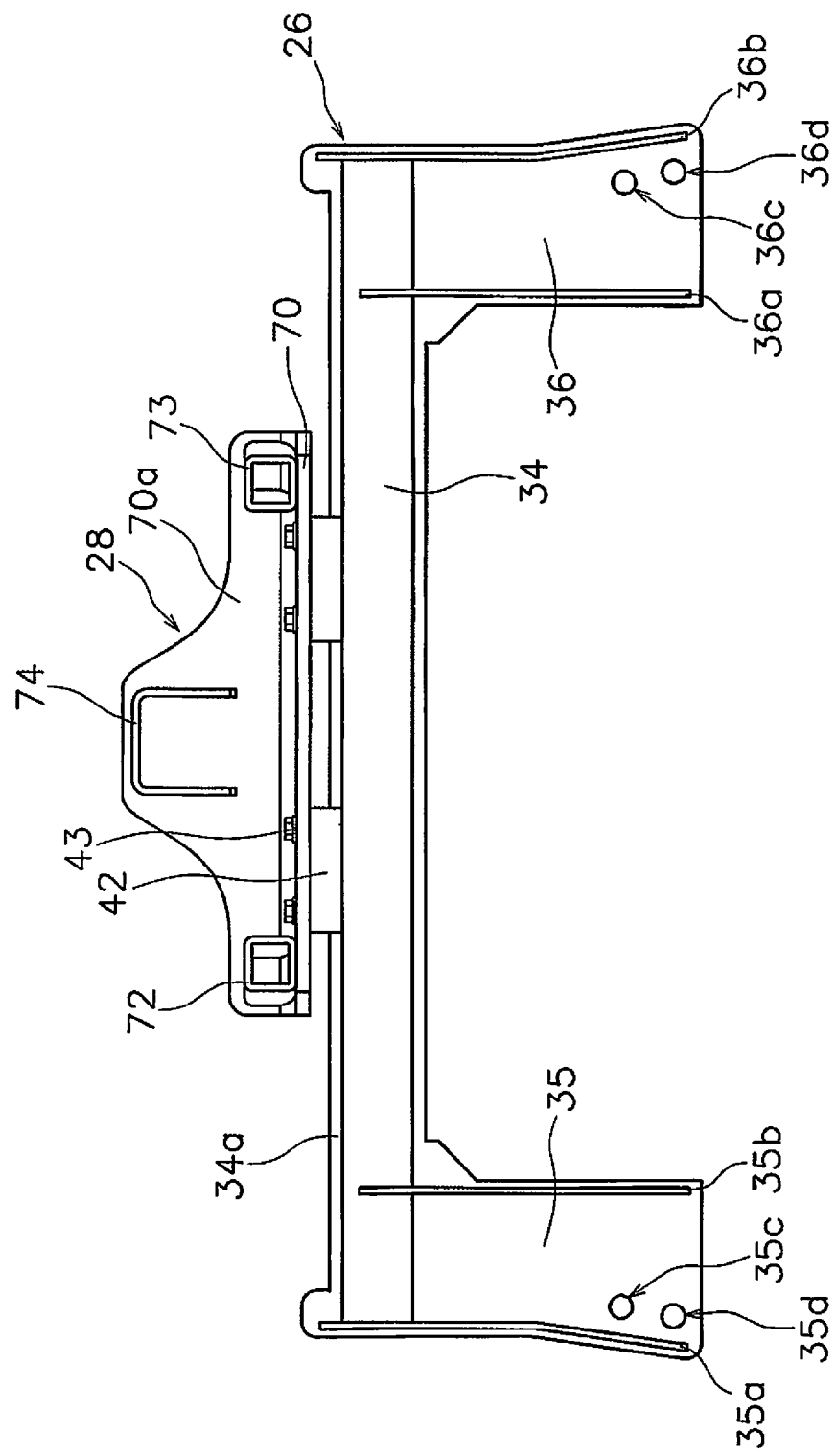
FIG. 8 illustrates a cross-sectional view of the first supporting member and the base member as seen in a direction of a cross-sectional line VIII-VIII in FIG. 7.

FIG. 8 illustrates a cross-sectional view of the first supporting member 26 and the base member 28 as seen in a direction of a cross-sectional line VIII-VIII in FIG. 7. As illustrated in FIG. 8, the first supporting member 26 includes a first left leg part 35, a first right leg part 36, and a first upper beam part 34. The first left leg part 35 and the first right leg part 36 respectively extend upward from the vicinity of the right and left ends of the coupling part 33.

The first left leg part 35 includes ribs 35a and 35b that protrude toward the rear of the vehicle, and bolt holes 35c and 35d for allowing the bolts 92 to pass through. The upper sides (hereinbelow referred to as "upper side parts") above the center in the vertical direction of the ribs 35a and 35b protrude toward the rear more than lower sides (hereinbelow referred to as "lower side parts") below the center. The bolt holes 35c and 35d are positioned below the upper end of the coupling part 33. The bolt holes 35c and 35d are provided at positions near the left end of the coupling part 33. That is, the bolt holes 35c and 35d are provided at positions near the left side part 30.

The first right leg part 36 includes ribs 36a and 36b that protrude toward the rear of the vehicle, and bolt holes 36c and 36d for allowing the bolts 92 to pass through. The upper sides (hereinbelow referred to as "upper side parts") above the center in the vertical direction of the ribs 36a and 36b protrude toward the rear more than lower sides (hereinbelow referred to as "lower side parts") below the center. The bolt holes 36c and 36d are positioned below the upper end of the coupling part 33. The bolt holes 36c and 36d are provided in positions near the right end of the coupling part 33. That is, the bolt holes 36c and 36d are provided in positions near the right side part 31.

The first upper beam part 34 is coupled with the ribs 35a and 36b at both ends in the left-right direction of the first upper beam part 34. The first upper beam part 34 is coupled with the ribs 35b and 36a at the rear end and the bottom end of the first upper beam part 34. The first upper beam part 34 is further fixed to a base plate 34a at the front end thereof. Consequently, warping of the first upper beam part 34 to the rear and downward can be limited even when a heavy object is mounted on the base member 28.

As illustrated in FIGS. 5 and 7, the second supporting member 27 includes a second left leg part 37, a second right leg part 38, a second upper beam part 39, and a receiving part 40. The second left leg part 37 and the second right leg part 38 respectively have attachment parts 37a and 38a at the bottom end parts. As illustrated in FIG. 7, the attachment parts 37a and 38a are approximately wedge-shaped as seen in a side view. As illustrated in FIG. 2, the lower ends of the attachment parts 37a and 38a are formed to extend in the left-right direction and in the forward direction. The portions extending in the left-right direction are fixed to the vehicle frame 2 with the plurality of bolts 90. The second left leg part 37 and the second right leg part 38 extend in the vertical direction and are disposed side by side in the vehicle width direction. As illustrated in FIG. 5, the second upper beam part 39 is fixed to the upper parts of the second left leg part 37 and the second right leg part 38, and extends in the vehicle width direction. The receiving part 40 is attached to the middle of the second upper beam part 39 in the vehicle width direction.

Because the receiving part 40 protrudes upward further than the second upper beam 39 and the width of the receiving part 40 in the longitudinal direction (that is, the left-right direction) is shorter than that of the second upper beam part 39 in the second supporting member 27, spaces S1 and S2 for disposing members are formed in the longitudinal direction of the receiving part 40. In the present exemplary embodiment, a portion of the connecting pipe 23 and a pipe 41 that protrude above the engine 15 and is connected to a cooling unit 16 are disposed to use the spaces S1 and S2 as illustrated in FIGS. 2 and 5. That is, the connecting pipe 23 passes beside the first pipe member 72 and passes between the sub-bracket 75 and the first connecting part 70 or between the sub-bracket 75 and the second connecting part 71. Moreover, as illustrated in FIG. 2, the connecting pipe 23 passes between the sub-bracket 75 and the second connecting part 71 and overlaps the second upper beam part 39 as seen from above but does not overlap the receiving part 40 in a top view.

As illustrated in FIGS. 3 and 5, the second supporting member 27 may further include a fixing plate 60 and a U-shaped metal fitting 61. The bottom end of the fixing plate 60 is fixed to the second upper beam part 39. Both ends of the U-shaped metal fitting 61 that holds the rear part (exhaust gas downstream side) of the flexible pipe section 23b of the connecting pipe 23 are fixed to the standing side of the fixing plate 60 with nuts 62.

The base member 28 is provided between the first supporting member 26 and the receiving part 40 of the second supporting member 27. As illustrated in FIG. 6, the base member 28 includes a first connecting part 70, a second connecting part 71, the first pipe member 72, and the second pipe member 73. Moreover, the base member 28 preferably includes the middle member 74 and the sub-bracket 75. The sub-bracket 75 includes an extension member 76, a first mounting bracket 77, and a second mounting bracket 78. A component that includes a portion of the parts of the base member 28 is called a base bracket. The base bracket is disposed above the engine 15.

As illustrated in FIGS. 6 and 8, the first connecting part 70 is joined to the first supporting member 26. More specifically, the first connecting part 70 is mounted near the middle of the first upper beam part 34 of the first supporting member 26 in the left-right direction. Consequently, the first supporting member 26 supports one side of the base member 28. The first supporting member 26 supports one side of the base bracket. The first connecting part 70 is formed such that the distance in the longitudinal direction of the first connecting part 70 is shorter than the distance in the longitudinal direction of the first upper beam part 34. As illustrated in FIG. 8, spacers 42 may be installed in two locations between the lower surface of the first connecting part 70 and the upper surface of the first upper beam part 34 of the first supporting member 26. The spacers 42 are fixed to the upper surface of the first connecting part 70 with bolts 43. As illustrated in FIG. 8, the first connecting part 70 may include a first end plate 70a fixed to one end (for example, the front end) of the first pipe member 72, one end of the second pipe member 73, and one end of the middle member 74. Consequently, the positional relationship between the first pipe member 72, the second pipe member 73, and the middle member 74 is fixed and thus a load on the first pipe member 72 and the second pipe member 73 can be distributed to the middle member 74.

Figure 9:
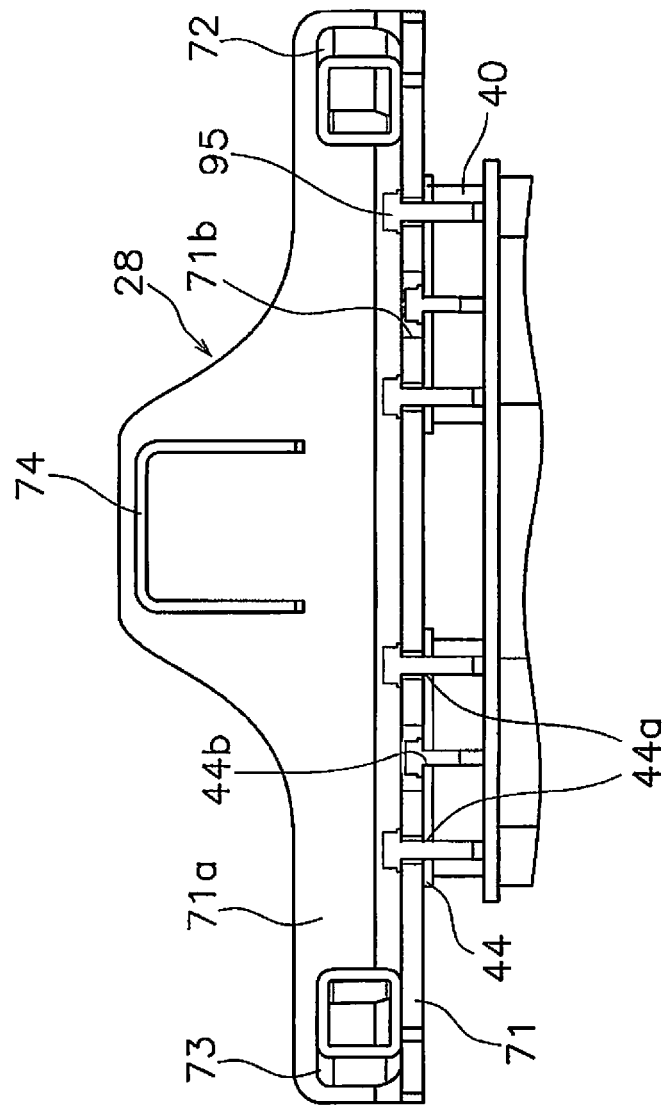
FIG. 9 illustrates a cross-sectional view of the base member and a partial cross-section of the second supporting member as seen in a direction of a cross-sectional line IX-IX in FIG. 7.

FIG. 9 illustrates a cross-sectional view of the base member 28 and a partial cross-section of the second supporting member 27 as seen in a direction of a cross-sectional line IX-IX in FIG. 7. As illustrated in FIGS. 7 and 9, the second connecting part 71 is joined to the second supporting member 27. That is, the base member 28 is coupled to the receiving part 40. More specifically, the second connecting part 71 is mounted over the receiving part 40 of the second supporting member 27. Consequently, the second supporting member 27 supports the other side (for example, the rear side) of the base member 28. The second supporting member 27 supports the other side of the base bracket. The second connecting part 71 is formed such that the distance in the longitudinal direction of the second connecting part 71 is greater than the distance in the longitudinal direction of the receiving part 40. As illustrated in FIG. 9, the second connecting part 71 may include a second end plate 71a that is attached to the other end (for example, the rear end) of the first pipe member 72, the other end of the second pipe member 73, and the other end of the middle member 74. Consequently, the positional relationship between the first pipe member 72, the second pipe member 73, and the middle member 74 is fixed and thus a load on the first pipe member 72 and the second pipe member 73 can be distributed to the middle member 74.

As illustrated in FIG. 9, a shim 44 may be installed in two locations between the lower surface of the base member 28 and the upper surface of the receiving part 40 of the second supporting member 27. The shim 44 is used for adjusting the height of the exhaust treatment system 18 and the connecting pipe 23 when the base member 28 on which the exhaust treatment system 18 is mounted is fixed to the receiving part 40 of the second supporting member 27. The shim 44 is rectangular and has a pair of notches 44a at both ends in the left-right direction thereof, which open to one side, and a through-hole 44b located between the pair of notches 44a.

The shim 44 is fixed to the upper surface of the receiving part 40 by a bolt 95. A hole 71b having a diameter larger than the head of the bolt 95 is formed in the second connecting part 71 in the position where the bolt 95 is provided. Interference between the second connecting part 71 and the bolt 95 can be avoided due to the hole 71b. Therefore, the base plate 28 can be attached or detached with the shim 44 fixed to the receiving part 40.

The shim 44 can be prepared in various thicknesses. A height can be adjusted by using one shim 44 or using a plurality of shims 44 in combination.

As illustrated in FIGS. 6 to 9, the first pipe member 72 and the second pipe member 73 extend along a common horizontal plane and are disposed side by side in the vehicle width direction. The first pipe member 72 and the second pipe member 73 are installed between the first connecting part 70 and the second connecting part 71. The middle member 74 extends in the vehicle front-back direction between the first pipe member 72 and the second pipe member 73. As illustrated in FIG. 6, the first pipe member 72 includes, at at least one end of the one end (for example, the front end) and the other end (for example, the rear end), a first bend part that faces away from the second pipe member. More specifically, the first pipe member 72 includes a first bend part 72a that faces in a direction away from the second pipe member 73 at the one end, and a first bend part 72b that faces in the same direction at the other end. The first pipe member 72 includes a linear section 73c (see FIG. 6) between the first bend parts 72a and 72b. The second pipe member 73 includes, at at least the one end or the other end, a second bend part that faces in a direction away from the first pipe member 72. More specifically, the second pipe member 73 includes a second bend part 73a that faces in a direction away from the first pipe member 72 at the one end, and a second bend part 73b that faces in the same direction at the other end. The second pipe member 73 includes a linear section 73c (see FIG. 6) between the first bend parts 73a and 73b.

As illustrated in FIGS. 8 and 9, the first pipe member 72 and the second pipe member 73 are provided on the first connecting part 70 and the second connecting part 71. The middle member 74 is provided such that the lower end of the middle member 74 is above the first connecting part 70 and the second connecting part 71. The shape of the middle member 74 as seen in the longitudinal direction thereof is an upside-down U shape that has an opening section formed at the lower end thereof. However, the middle member 74 may be a pipe member. As illustrated in FIG. 6, the edges of the first pipe member 72, the second pipe member 73, the first connecting part 70, and the second connecting part 71 form an opening section 100.

A first direction from the middle (portion in which the middle member 74 overlaps the first connecting part 70) in the longitudinal direction of the first connecting part 70 to the middle (portion in which the middle member overlaps the second connecting part 71) in the longitudinal direction of the second connecting part 71 extends along the vehicle front-back direction. That is, the longitudinal direction of the first exhaust treatment device 45 and the longitudinal direction of the second exhaust treatment device 47 extends along the first direction. The first pipe member 72 and the second pipe member 72 both extend in the first direction. As illustrated in FIG. 6, the first exhaust treatment device 45 overlaps a portion of the first pipe member 72 as seen from above. More specifically, the first exhaust treatment device 45 overlaps the linear section 72c of the first pipe member 72. Moreover, the second exhaust treatment device 47 overlaps a portion of the second pipe member 73 as seen from above. More specifically, the second exhaust treatment device 47 overlaps the linear section 73c of the second pipe member 73.

As illustrated in FIG. 6, the extension member 76 extends in the lateral direction of the first pipe member 72 and the second pipe member 73. The extension member 76 is a flat member that extends in the lateral direction of at least one of the first pipe member 72, the second pipe member 73, and the middle member 74. That is, the sub-bracket 75 extends in the lateral direction of at least one of the pipe members including the first pipe member 72 and the second pipe member 73 therefrom. The sub-bracket 75 is separated from the first connecting part 70 and the second connecting part 71. As illustrated in FIG. 6, the length of the extension member 76 in the first direction is shorter than the length of the first exhaust treatment device 45 in the longitudinal direction thereof and shorter than the length of the second exhaust treatment device 47 in the longitudinal direction thereof. As a result, a portion of the connecting pipe 23 or the pipe 41 can be extended upward easily.

Figure 10:
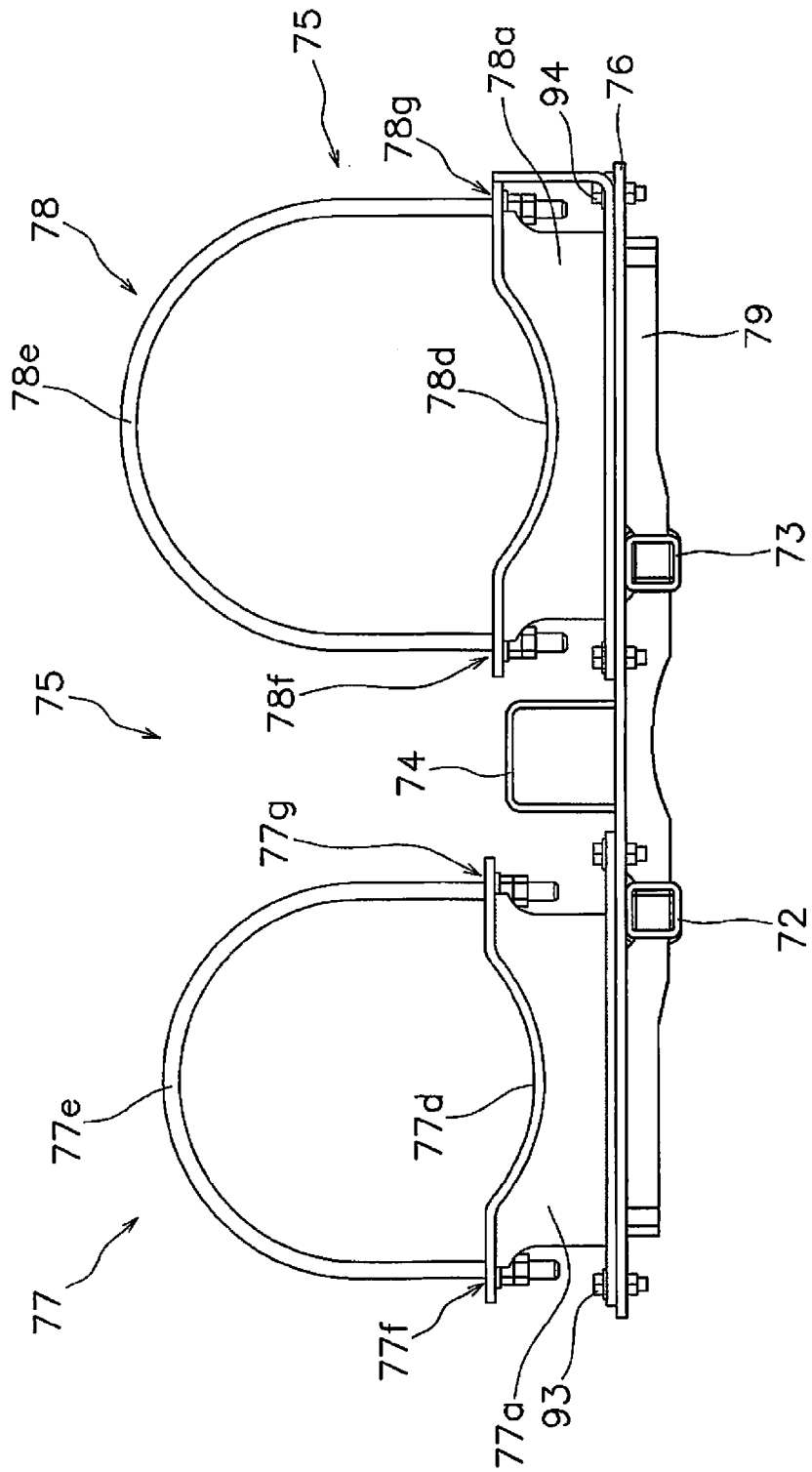
FIG. 10 illustrates a cross-sectional view of the first pipe member, the second pipe member, the middle member, and a sub-bracket as seen in a direction of a cross-sectional line X-X in FIG. 7.

FIG. 10 illustrates a cross-sectional view of the first pipe member 72, the second pipe member 73, the middle member 74 and the sub-bracket 75 as seen in a direction of a cross-sectional line X-X in FIG. 7. Accordingly, the middle member 74 is fixed to the upper surface of the extension member 76. The first pipe member 72 and the second pipe member 73 are fixed to the lower surface of the extension member 76. At least one of the pipe members including the first pipe member 72 and the second pipe member 73 is fixed to the lower surface of the sub-bracket 75. That is, the sub-bracket 75 is attached to at least one of the pipe members including the first pipe member 72 and the second pipe member 73. The sub-bracket 75 is supported by the base bracket. Therefore, a lower end of the middle member 74 is positioned higher than the upper ends of the first pipe member 72 and the second pipe member 73. That is, the middle member 74 extends in the vehicle front-back direction (that is, the first direction) above the sub-bracket 75. The middle member 74 is installed between the first connecting part 70 and the second connecting part 71.

The first pipe member 72, the second pipe member 73, the middle member 74, and the extension member 76 that are behind the second end plate 71a of the second connecting part 71 are represented by a dotted line in FIG. 5. Accordingly, the upper end of the middle member 74 is positioned higher than the lower end of the first exhaust treatment device 45 and the lower end of the second exhaust treatment device 47. The upper end of the middle member 74 is positioned lower than the lower end of the relay connecting pipe 48. In this way, the exhaust treatment system 18 is supported in a stable manner by the base member 28 due to the middle member 74 supporting the exhaust treatment system 18 provided in such a high position.

As illustrated in FIGS. 6 and 10, the first mounting bracket 77 is attached to the upper surface of the extension member 76 with a plurality of bolts 93. The second mounting bracket 78 is attached to the upper surface of the extension member 76 with a plurality of bolts 94. That is, the first mounting bracket 77 and the second mounting bracket 78 are disposed on the extension member 76. As illustrated in FIG. 6, the first mounting bracket 77 includes a first mounting part 77a, a first flange fixing part 77b, and a first U-shaped bolt 77e. The second mounting bracket 78 includes a second mounting part 78a, a second flange fixing part 78b, and a second U-shaped bolt 78e.

The first mounting part 77a has a contact surface 77d that corresponds to the external peripheral surface of the first exhaust treatment device 45. Specifically, the first mounting part 77a has the contact surface 77d having a convex shape that bulges downward. The first mounting part 77a includes, at the right and left sides of the contact surface 77d, a pair of insertion holes 77f and 77g through which the first U-shaped bolt 77e passes. As illustrated in FIG. 3, the first flange fixing part 77b is attached to the front surface of a flange 45c of the first exhaust treatment device 45. Rotation around the center axial line of the first exhaust treatment device 45 is limited because the flange 45c of the first exhaust treatment device 45 is fixed to the first flange fixing part 77b. Moreover, the first exhaust treatment device 45 is supported in a stable manner on the first mounting bracket 77 because the first exhaust treatment device 45 is fixed by the contact surface 77d and the first U-shaped bolt 77e.

The second mounting part 78a has a contact surface 78d that corresponds to the external peripheral surface of the second exhaust treatment device 47. Specifically, the second mounting part 78a has the contact surface 78d having a convex shape that bulges downward. The second mounting part 78a includes, at the right and left sides of the contact surface 78d, a pair of insertion holes 78f and 78g through which the second U-shaped bolt 78e passes. As illustrated in FIG. 4, the second flange fixing part 78b is attached to the front surface of a flange 47c of the second exhaust treatment device 47. Rotation around the center axial line of the second exhaust treatment device 47 is limited because the flange 47c of the second exhaust treatment device 47 is fixed to the second flange fixing part 78b. Moreover, the second exhaust treatment device 47 is supported in a stable manner on the second mounting bracket 78 because the second exhaust treatment device 47 is fixed by the contact surface 78d and the second U-shaped bolt 78g.

In this way, the first mounting bracket 77 fixes the first exhaust treatment device 45 and the second mounting bracket 78 fixes the second exhaust treatment device 47. Therefore, the base member 28 supports the first exhaust treatment device 45 and the second exhaust treatment device 47. In other words, the sub-bracket 75 supports the first exhaust treatment device 45 and the second exhaust treatment device 47.

As illustrated in FIG. 6, the first mounting bracket 77 has a hole 77c in the middle of the first mounting bracket 77 in a top view. Similarly, the second mounting bracket 78 has a hole 78c in the middle of the second mounting bracket 78 in a top view. The extension member 76 has holes 76a and 76b in positions corresponding to the holes 77c and 78c. That is, the sub-bracket 75 has the holes 76a and 76b that penetrate in the vertical direction, and at least one of the first mounting bracket 77 and the second mounting bracket 78 has the holes 77c and 78c that correspond to the holes 76a and 76b. As illustrated in FIG. 10, the sub-bracket 75 may include a rib 79 attached to the lower surface of the extension member 76. The rib 79 may be provided at any position on the lower surface of the extension member 76 except for the attachment locations of the first pipe member 72 and the second pipe member 73, the attachment locations of the bolts 93 and 94, the locations of the holes 76a and 76b, and above the sensor part 25. The rib 79 limits bending at both side end parts of the sub-bracket 75 due to loads applied in the vicinity of both side ends of the sub-bracket 75.

Relationship Between Sensor Part 25, Upper Member 15b, and Base Member 28

Figure 11:
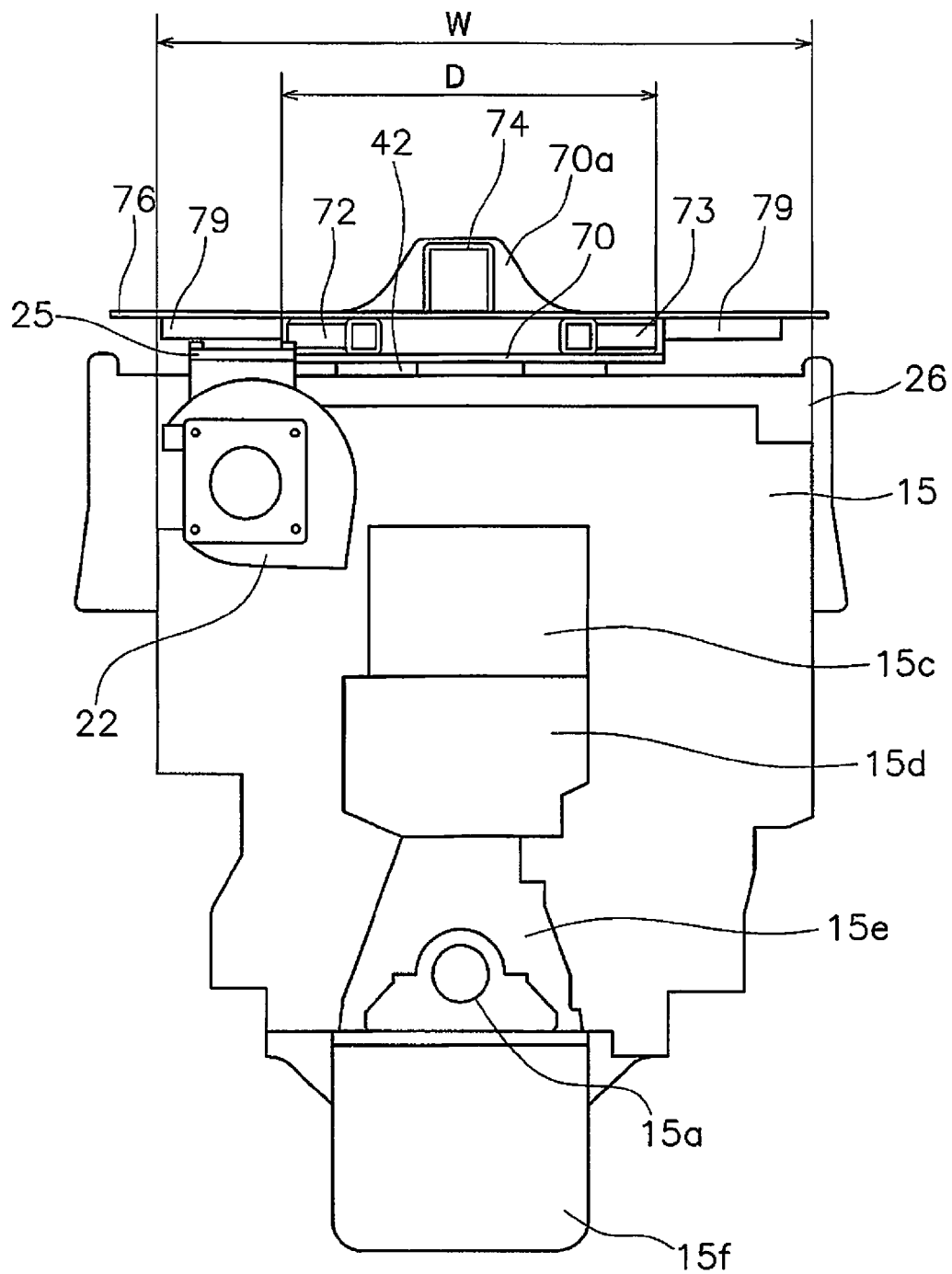
FIG. 11 is a cross-sectional view as seen in a direction of a cross-sectional line XI-XI in FIG. 3.

FIG. 11 is a cross-sectional view as seen in a cross-sectional line XI-XI in FIG. 3. The illustration of the vehicle frame is omitted in FIG. 11. Moreover, in addition to the crankshaft 15a, an oil pan 15f as well as a cylinder head 15c, a cylinder body 15d, and a crank case 15e inside the engine 15 are depicted in FIG. 11. Accordingly, the upper end of the turbo charger 22 is positioned further above the upper end of the cylinder head 15c. Moreover, the upper end of the sensor part 25 is positioned further above the upper end of the turbo charger 22. That is, the sensor part 25 protrudes above the engine 15. The upper end of the sensor part 25 is positioned above the lower ends of the first pipe member and the second pipe member. The upper end of the sensor part 25 is positioned below the lower surface of the extension member 76. The height of the upper end of the sensor part 25 is approximately the same as the height of the lower end of the rib 79c.

As illustrated in FIG. 6, the sensor part 25 is positioned below the sub-bracket 75. More precisely, a portion of the sensor part 25 is positioned under the sub-bracket 75. However, because the rib 79 is not provided over the sensor part 25, the rib 79 and the sensor part 25 do not come into contact even if the wheel loader 1 vibrates. The first pipe member 72 and the sensor part 25 are sufficiently apart from each other because the first bend parts 72a and 72b are provided in the first pipe member 72. Consequently, the sensor part 25 and the first pipe member 72 do not come into contact even if the wheel loader 1 vibrates.

Moreover, as illustrated in FIG. 11, a maximum distance D in the vehicle width direction (the direction parallel to the abovementioned longitudinal direction of the first connecting part 70, or the direction parallel to the longitudinal direction of the second connecting part 71) of the first pipe member 72 and the second pipe member 73 is smaller than a distance W in the vehicle width direction of the engine. As a result, the first pipe member 72 and the sensor part 25 are able to be sufficiently apart from each other even when the amounts of bending of the first bend parts 72a and 72b are not large. Moreover, as illustrated in FIG. 11, the length of the extension member 76 in the vehicle width direction (the direction parallel to the abovementioned longitudinal direction of the first connecting part 70, or the direction parallel to the longitudinal direction of the second connecting part 71) is longer than the distance D, and moreover, longer than the distance W in the vehicle width direction of the engine. That is, the length of the sub-bracket 75 in the vehicle width direction (the direction parallel to the abovementioned longitudinal direction of the first connecting part 70, or the direction parallel to the longitudinal direction of the second connecting part 71) is longer than the distance D, and moreover, longer than the distance W in the vehicle width direction of the engine.

Figure 12:
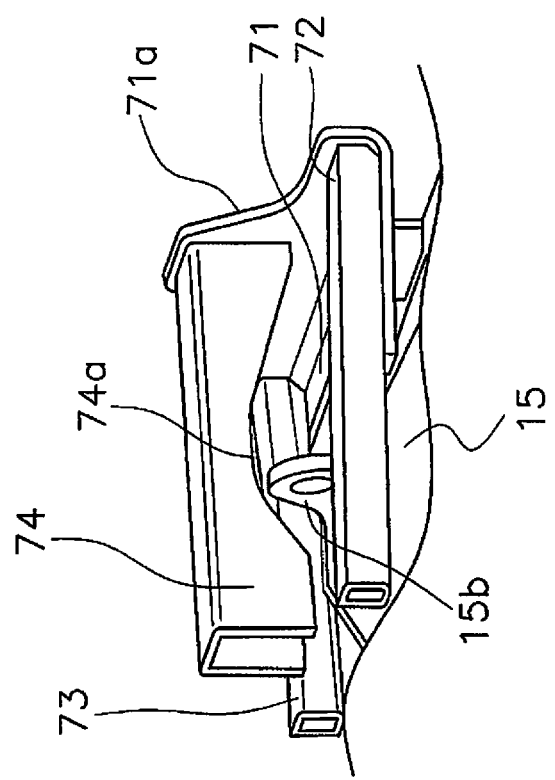
FIG. 12 is an enlarged perspective view in the vicinity of a hook attachment part.

FIG. 12 is an enlarged perspective view of the vicinity of the upper member 15b. As illustrated in FIG. 5, the upper end of the upper member 15b is positioned above the lower end of the middle member 74. Therefore, the middle member 74 includes a recessed part 74a that is recessed upwards over the upper member 15b. Consequently, the upper member 15b and the middle member 74 do not come into contact even when the wheel loader 1 vibrates. As illustrated in FIGS. 5 and 12, the upper member 15b protrudes upward from a gap between the first pipe member 72 and the second pipe member 73. That is, the upper member 15b passes through the opening section 100 within the region enclosed by the first connecting part 70, the second connecting part 71, the first pipe member 72, and the second pipe member 73.

Characteristics

The supporting mechanism 17 includes at least one of the first pipe member 72 and the second pipe member 73. The first exhaust treatment device 45 overlaps the first pipe member 72 in a top view. Moreover, the second exhaust treatment device 47 overlaps the second pipe member 73 in a top view. Therefore, the first pipe member 72 is able to support the first exhaust treatment device 45 in a stable manner, and the second pipe member 73 is able to support the second exhaust treatment device 47 in a stable manner. Moreover, the supporting mechanism 17 is provided with the sub-bracket 75 that extends in the lateral direction of at least one of the pipe members 72 and 73 therefrom. The sub-bracket 75 is separated from the first connecting part 70 and the second connecting part 71. Consequently, when the sub-bracket 75 is arranged to keep away from parts (for example, the sensor part 25, the connecting pipe 23, and the pipe 41) that protrude upward from the vicinity of the engine in particular from the left and the right sides of the engine 15, the base bracket can be installed in a position as low as possible. Therefore, the exhaust treatment device is disposed in a position as low as possible so that rearward visibility may be improved in the wheel loader 1 in which the exhaust treatment device is disposed above the engine 15.

At least one of the pipe members 72 and 73 is attached to the lower surface of the sub-bracket 75. Consequently, when at least one of the pipe members 72 and 73 is arranged to keep away from parts (for example, the upper member 15b) that protrude upward from the vicinity of the middle in the left-right direction of the engine 15, the sub-bracket 75 can be installed in a position as low as possible. Therefore, the exhaust treatment device is arranged in a further lower position so that rearward visibility can be further improved.

The sub-bracket 75 has the holes 76a and 76b that penetrate in the vertical direction. Consequently, weight reduction of the sub-bracket 75 can be achieved. Moreover, because the turbo charger 22, which is disposed in a relatively high position compared to other parts of the engine, is disposed under the hole 76a, which prevents the turbo charger 22 from contacting the sub-bracket 75.

At least one of the pipe members 72 and 73 extend in the vehicle front-back direction (that is, in the abovementioned first direction), and the longitudinal direction of the first exhaust treatment device 45 and the longitudinal direction of the second exhaust treatment device 47 both extend in the vehicle front-back direction (that is, the abovementioned first direction), and the first exhaust treatment device 45 and the second exhaust treatment device 47 are disposed side by side in the horizontal direction. Therefore, at least one of the pipe members 72 and 73, the first exhaust treatment device 45, and the second exhaust treatment device 47 have a substantially parallel relationship with each other. Therefore, the base bracket and the sub-bracket 75 are able to support in a stable manner the first exhaust treatment device 45 and the second exhaust treatment device 47.

The base bracket further includes the middle member 74 above the sub-bracket 75. Consequently, the base bracket and the sub-bracket 75 are able to support in a further stable manner the first exhaust treatment device 45 and the second exhaust treatment device 47.

The upper end of the middle member 74 is positioned higher than the lower end of the first exhaust treatment device 45 and the lower end of the second exhaust treatment device 47. Consequently, the middle member 74 supports the sub-bracket 75 at a position closer to the center of gravity of the first exhaust treatment device 45 and the second exhaust treatment device 47, so that the base member 28 can support in a more stable manner the first exhaust treatment device 45 and the second exhaust treatment device 47.

The upper end of the middle member 74 is positioned lower than the lower end of the relay connecting pipe 48. Consequently, the relay connecting pipe 48 can be disposed between the first exhaust treatment device 45 and the second exhaust treatment device 47, such that the length of the relay connecting pipe 48 can be shortened and the exhaust treatment system 18 can be made in a more compact manner.

The first pipe member 72 and the second pipe member 73 are included in at least one of the pipe members. The first pipe member 72 includes, at one end and at the other end, the first bend parts 72a and 72b that face away from the second pipe member 73, and the second pipe member 73 includes, at one end and at the other end, the second bend parts 73a and 73b that face away from the first pipe member 72. Consequently, the first pipe member 72 and the second pipe member 73 can be positioned to keep away from in particular parts (for example, the upper member 15b) that protrude from the vicinity of the edge part of the middle in the front and back of the engine 15. Moreover, because the first supporting member 26 or the second supporting member 27 is able to support the first pipe member 72 and the second pipe member 73 in the lateral direction as much as possible due to the first bend parts 72a and 72b and the second bend parts 73a and 73b, loads on the bolts 43 and 95 when swinging in the longitudinal direction of the first supporting member 26, in other words, in the longitudinal direction of the second supporting member 27, can be reduced.

The first connecting part 70 includes the first end plate 70a and the second connecting part 71 includes the second end plate 71a. Consequently, the positional relationship between the first pipe member 72, the second pipe member 73, and the middle member 74 is fixed and thus a load on the first pipe member 72 and the second pipe member 73 can be distributed to the middle member 74.

The sensor part 25 that protrudes upward from the upper part of the engine is positioned below the sub-bracket 75. The sub-bracket 75 is positioned above at least one of the pipe members 72 and 73. Therefore, by disposing at least one of the pipe members 72 and 73 to keep away from the sensor part 25, the exhaust treatment device can be disposed in a low position and rearward visibility can be improved.

The sub-bracket 75 includes the first mounting bracket 77 and the second mounting bracket 78. Consequently, the first exhaust treatment device 45 and the second exhaust treatment device 47 are supported by the sub-bracket 75 in a stable manner.

The connecting pipe 23 passes beside the first pipe member 72 and passes between the sub-bracket 75 and the first connecting part 70 or between the sub-bracket 75 and the second connecting part 71. Consequently, the connecting pipe 23 is able to connect the engine 15 below the sub-bracket 75 and the first exhaust treatment device 45 above the sub-bracket 75 without a large increase in the length of the connecting pipe 23.

The width in the longitudinal direction of the receiving part 40 is shorter than the width in the longitudinal direction of the second upper beam part 39. Consequently, spaces for disposing members are formed in the longitudinal direction of the receiving part 40. Moreover, the connecting pipe 23 passes through behind the sub-bracket 75 and overlaps the second upper beam part 39 but does not overlap the receiving part 40 in a top view. Consequently, the connecting pipe 23 is able to connect the engine 15 below the sub-bracket 75 and the first exhaust treatment device 45 above the sub-bracket 75 without a large increase in the length of the connecting pipe 23. Furthermore, the connecting pipe 23 can be fixed by the fixing plate 60 and the U-shaped metal fitting 61 of the second supporting member 27.

The first supporting member 26 is fixed to the stand 20 of the hydraulic fluid tank 19. Consequently, the number of components of the first supporting member 26 are reduced and costs can be reduced.

Other Exemplary Embodiments

The present invention is not limited to the above exemplary embodiments and various changes and modifications may be made without departing from the spirit of the invention.

In the above exemplary embodiment, the first exhaust treatment device 45 is described as a diesel particulate filter device and the second exhaust treatment device 47 is described as a selective catalytic reduction device. However, the first exhaust treatment device 45 may be the selective catalytic reduction device and the second exhaust treatment device 47 may be the diesel particulate filter device. However, because the exhaust gas from the engine is fed preferably to the diesel particulate filter device first, in the above case, the order and the orientation of the pipes connecting the first exhaust treatment device 45 and the second exhaust treatment device 47 would be reversed. The first exhaust treatment device 45 may be a diesel oxidation catalyst (DOC) instead of the diesel particulate filter device.

The first exhaust treatment device 45 and the second exhaust treatment device 47 are not limited to tubular shapes and may have oval shapes, rectangular shapes, or other shapes. In this case, the shapes of the contact surfaces 77d and 78d respectively correspond to the shape of the side surface of the first exhaust treatment device 45 and the shape of the side surface of the second exhaust treatment device 47.

The positions and numbers of holes for attaching the bolts 90, 91, 92, 43, and 95 may be changed as appropriate. Moreover, the fixing methods using the bolts 90, 91, 92, 43, and 95 are merely examples and other fixing means may be used. For example, a fixing method such as hooks or welding may be used.

In the above exemplary embodiment, the connecting pipe 23 protrudes from the rear of the sub-bracket 75. However, the connecting pipe 23 may protrude from the front of the sub-bracket 75. In this case, the turbo charger 22 is preferably provided so that the discharge port faces forward and the exhaust gas inlet port 45a of the first exhaust treatment device 45 is preferably provided at the front of the first exhaust treatment device 45. Similarly, the pipe 41 may also protrude from the front of the sub-bracket 75.

Figure 13:
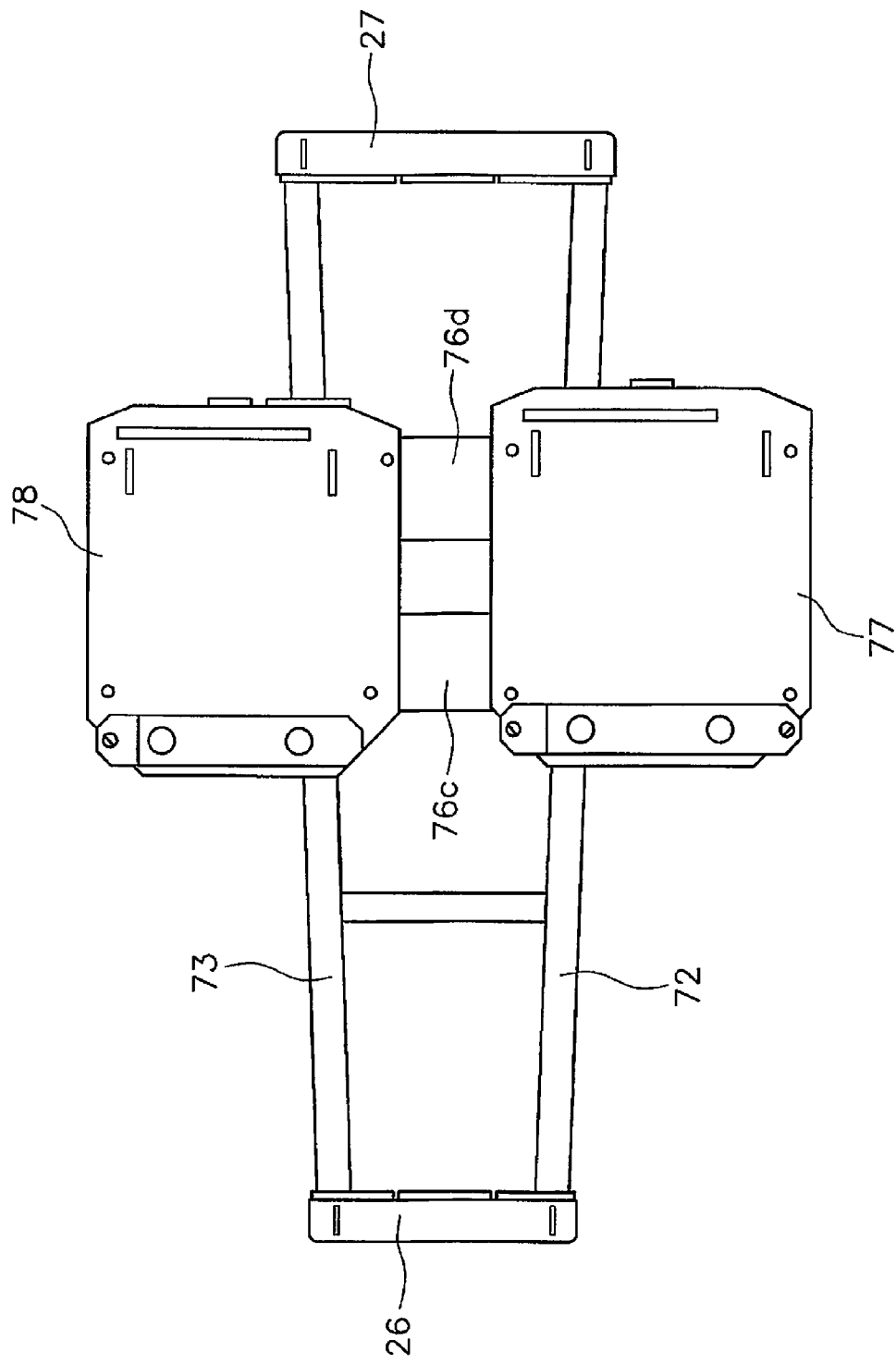
FIG. 13 is a modified example of the supporting mechanism.

The specific shapes of the first supporting member 26 and the second supporting member 27 that configure the supporting mechanism 17 are not limited to the above exemplary embodiment. For example, as illustrated in FIG. 13, the first pipe member 72 and the second pipe member 73 may be linear and the first mounting bracket 77 and the second mounting bracket 78 may be supported by two extension members 76c and 76d. While not illustrated, the extension members 76c and 76d extend from the vicinity of one end of the lower surface of the first mounting bracket 77 to the vicinity of the other end of the lower surface of the second mounting bracket 78.

The orientation in which the supporting mechanism 17 is disposed is not limited to the orientation of the above exemplary embodiment. For example, the front and the back may be reversed, and the direction that the first pipe member 72, the second pipe member 73, and the middle member 74 extend may be the left-right direction.

According to the exemplary embodiments of the present invention, a wheel loader is provided in which the exhaust treatment device is disposed in a position as low as possible above the engine so that rearward visibility is improved.

What is claimed is:

1. A supporting mechanism that supports a first exhaust treatment device and a second exhaust treatment device for treating exhaust gas from an engine, the mechanism comprising:
a sub-bracket supporting the first exhaust treatment device and the second exhaust treatment device;
a base bracket supporting the sub-bracket;
a first supporting member supporting one side of the base bracket; and
a second supporting member supporting the other side of the base bracket,
wherein
the base bracket includes
a first connecting part joined to the first supporting member;
a second connecting part joined to the second supporting member; and
a first pipe member and a second pipe member installed between the first connecting part and the second connecting part,
wherein
the sub-bracket is fixed to the first pipe member and the second pipe member,
the sub-bracket extends outwardly in the lateral direction of the first pipe member and the second pipe member therefrom, and
the sub-bracket is separated from the first connecting part and the second connecting part.

2. The supporting mechanism according to claim 1, wherein the first pipe member and the second pipe member are attached to a lower surface of the sub-bracket.

3. The supporting mechanism according to claim 1, wherein
the sub-bracket has a first hole penetrating in the vertical direction.

4. The supporting mechanism according to claim 1, wherein
a longitudinal direction of the first exhaust treatment device and a longitudinal direction of the second exhaust treatment device extend in a first direction from a middle of the first connecting part in the longitudinal direction thereof to a middle of the second connecting part in the longitudinal direction thereof.

5. The supporting mechanism according to claim 4, wherein
the first exhaust treatment device and the second exhaust treatment device are disposed side by side in the horizontal direction.

6. The supporting mechanism according to claim 1, wherein
the sub-bracket includes an extension member; and
the base bracket further includes a middle member installed above the extension member and between the first connecting part and the second connecting part.

7. The supporting mechanism according to claim 6, wherein
a lower end of the middle member is positioned higher than upper ends of the first pipe member and the second pipe member.

8. The supporting mechanism according to claim 6, wherein
the first connecting part further includes a first end plate attached to one end of the first pipe member, one end of the second pipe member, and one end of the middle member; and
the second connecting part further includes a second end plate attached to the other end of the first pipe member, the other end of the second pipe member, and the other end of the middle member.

9. The supporting mechanism according to claim 8, wherein
the first pipe member includes, at the one end and the other end, first bend parts facing away from the second pipe member; and the second pipe member includes, at the one end and the other end, second bend parts facing away from the first pipe member.

10. The supporting mechanism according to claim 6, wherein
the sub-bracket further includes
a first mounting bracket for fixing the first exhaust treatment device; and
a second mounting bracket for fixing the second exhaust treatment device.

11. An exhaust treatment unit, comprising:
the supporting mechanism according to claim 6;
the first exhaust treatment device, and
the second exhaust treatment device, wherein
an upper end of the middle member is positioned higher than a lower end of the first exhaust treatment device and a lower end of the second exhaust treatment device.

12. The exhaust treatment unit according to claim 11, further comprising
a relay connecting pipe connecting the first exhaust treatment device and the second exhaust treatment device, wherein
an upper end of the middle member is positioned below a lower end of the relay connecting pipe.

13. A wheel loader comprising:
the supporting mechanism according to claim 1; and
the engine,
wherein
the engine includes a sensor part in an upper part of the engine; and
the sensor part is positioned below the sub-bracket.

14. A wheel loader comprising:
the supporting mechanism according to claim 1; and
a connecting pipe connecting the engine and the first exhaust treatment device, wherein the connecting pipe passes beside the first pipe member between the sub-bracket and the first connecting part.

15. The wheel loader according to claim 13, further comprising
a hydraulic fluid tank disposed in front of the engine; and
a stand supporting the hydraulic fluid tank,
wherein
the first supporting member is fixed to the stand.

16. The wheel loader according to claim 13, further comprising
a vehicle frame, wherein
the second supporting member includes
a left leg part and a right leg part fixed to the vehicle frame, the left leg part and the right leg part extending in the vertical direction, the left leg part and the right leg part disposed apart in the vehicle width direction;
an upper beam part fixed to an upper part of the left leg part and to an upper part of the right leg part, the upper beam part extending in the vehicle width direction; and
a receiving part fixed to the upper beam part in the middle in the vehicle width direction, the receiving part extending upward from the upper beam part, the receiving part coupled with the base bracket.

17. The wheel loader according to claim 13, wherein
the first exhaust treatment device is a diesel particulate filter device, and
the second exhaust treatment device is a selective catalytic reduction device.

\* \* \* \* \*